(12) United States Patent
Yi et al.

(10) Patent No.: US 12,108,497 B2
(45) Date of Patent: Oct. 1, 2024

(54) ACCESS POINT (AP) COORDINATED PEER-TO-PEER (P2P) COMMUNICATIONS IN WIRELESS FIDELITY (WI-FI) NETWORK

(71) Applicant: Intel Corporation, Santa Clara, CA (US)

(72) Inventors: Zhaohua Yi, Portland, OR (US); Carlos Cordeiro, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 770 days.

(21) Appl. No.: 17/131,801

(22) Filed: Dec. 23, 2020

(65) Prior Publication Data

US 2021/0112626 A1 Apr. 15, 2021

(51) Int. Cl.
| | |
|---|---|
| *H04W 88/10* | (2009.01) |
| *H04L 47/70* | (2022.01) |
| *H04W 4/70* | (2018.01) |
| *H04W 28/02* | (2009.01) |
| *H04W 48/20* | (2009.01) |
| *H04W 76/11* | (2018.01) |
| *H04W 76/14* | (2018.01) |
| *H04W 84/12* | (2009.01) |

(52) U.S. Cl.
CPC ............ *H04W 88/10* (2013.01); *H04W 4/70* (2018.02); *H04W 28/0278* (2013.01); *H04W 48/20* (2013.01); *H04W 76/11* (2018.02); *H04W 76/14* (2018.02)

(58) Field of Classification Search
CPC ............ H04L 25/0242; H04L 25/0254; H04B 7/0456; H04B 7/0617; H04W 88/04; H04W 88/10; H04W 8/005; H04W 84/18; H04W 4/70; H04W 76/11; H04W 76/14; H04W 28/02; H04W 28/0278; H04W 48/20
See application file for complete search history.

(56) References Cited

U.S. PATENT DOCUMENTS

| | | | | |
|---|---|---|---|---|
| 2010/0325332 | A1* | 12/2010 | Matthews | G06F 13/4022 710/305 |
| 2011/0282989 | A1* | 11/2011 | Geirhofer | H04W 72/53 709/227 |
| 2012/0164980 | A1* | 6/2012 | Van Phan | H04L 63/08 455/445 |
| 2012/0250605 | A1* | 10/2012 | Du | H04W 28/0278 370/315 |
| 2012/0320886 | A1* | 12/2012 | Anders, Jr. | H04W 76/14 370/328 |

(Continued)

*Primary Examiner* — Jenee Holland
(74) *Attorney, Agent, or Firm* — East IP P.C.

(57) ABSTRACT

Provided herein are techniques for AP coordinated P2P communications in a Wi-Fi network. Embodiments describe an apparatus for an AP including processing circuitry to: encode a first trigger frame, to be transmitted to a plurality of STAs associated with the AP, to query a buffer status of each STA; receive one or more response frames from one or more of the plurality of STAs, each having data to be transmitted to a target receiver STA in the plurality of STAs; allocate one or more RUs for each of a group of STAs selected from the one or more STAs, based on the one or more response frames, and using OFDMA; and encode a second trigger frame, to be transmitted to the selected group of STAs and the target receiver STA for each of the group of STAs, to indicate the allocation of RUs.

20 Claims, 15 Drawing Sheets

(56) References Cited

U.S. PATENT DOCUMENTS

| | | | |
|---|---|---|---|
| 2014/0172947 A1* | 6/2014 | Ghai | H04L 65/102 |
| | | | 709/202 |
| 2015/0288766 A1* | 10/2015 | Lin | H04L 45/02 |
| | | | 709/227 |
| 2016/0080940 A1* | 3/2016 | Pang | H04W 4/80 |
| | | | 455/411 |
| 2016/0081109 A1* | 3/2016 | Li | H04W 72/569 |
| | | | 370/329 |
| 2017/0006628 A1* | 1/2017 | Takahashi | H04L 69/28 |
| 2017/0013638 A1* | 1/2017 | Takahashi | H04W 72/21 |
| 2017/0086168 A1* | 3/2017 | Takahashi | H04W 72/21 |
| 2017/0223665 A1* | 8/2017 | Chun | H04B 7/0456 |
| 2017/0262877 A1* | 9/2017 | Davey | G06Q 30/0242 |
| 2017/0289761 A1* | 10/2017 | Stojanovski | H04B 7/0456 |
| 2017/0332385 A1* | 11/2017 | Shirali | H04W 72/569 |
| 2018/0352566 A1* | 12/2018 | Hong | H04L 1/0029 |
| 2019/0081664 A1* | 3/2019 | Vermani | H04L 5/0035 |
| 2019/0238195 A1* | 8/2019 | Liu | H04L 1/0009 |
| 2020/0413285 A1* | 12/2020 | Li | H04W 28/0268 |
| 2021/0097795 A1* | 4/2021 | Manchovski | H04L 63/108 |
| 2021/0112626 A1* | 4/2021 | Yi | H04W 76/14 |
| 2021/0195460 A1* | 6/2021 | Park | H04W 28/0268 |
| 2021/0337413 A1* | 10/2021 | Rumsby | H04L 5/0037 |
| 2022/0053560 A1* | 2/2022 | Xin | H04W 28/0268 |
| 2022/0078844 A1* | 3/2022 | Cherian | H04W 74/0808 |
| 2022/0330262 A1* | 10/2022 | Kim | H04W 72/543 |
| 2023/0354377 A1* | 11/2023 | Yang | H04W 72/25 |

* cited by examiner

US 12,108,497 B2

ACCESS POINT (AP) COORDINATED PEER-TO-PEER (P2P) COMMUNICATIONS IN WIRELESS FIDELITY (WI-FI) NETWORK

TECHNICAL FIELD

Embodiments of the present disclosure generally relate to wireless communications, and particularly to access point (AP) coordinated peer-to-peer (P2P) communications in a Wireless Fidelity (Wi-Fi) network.

BACKGROUND

Technologies for P2P communications in a Wi-Fi network (which may be regarded as "Wi-Fi P2P"), such as, Wi-Fi Direct or Tunneled Direct Link Setup (TDLS), enable Wi-Fi devices to connect and communicate with each other without using an AP. The Wi-Fi P2P is widely used for applications, such as, direct file transfer, internet sharing, or connecting to a printer, etc. The Wi-Fi P2P is increasingly used in Internet of Things (IoT) applications, for its high efficiency and convenience. The Wi-Fi P2P is an efficient communication approach for devices which are deployed in proximity, especially for dense deployments, since local data traffic does not need to go through an AP.

However, in the dense deployments, if many devices simultaneously work in the Wi-Fi P2P mode, packet collisions would happy frequently, which may cause back-off, delay or retransmission.

BRIEF DESCRIPTION OF THE DRAWINGS

Embodiments of the disclosure will be illustrated, by way of example and not limitation, in the figures of the accompanying drawings, in which like reference numerals refer to similar elements.

DETAILED DESCRIPTION

Figure 1:
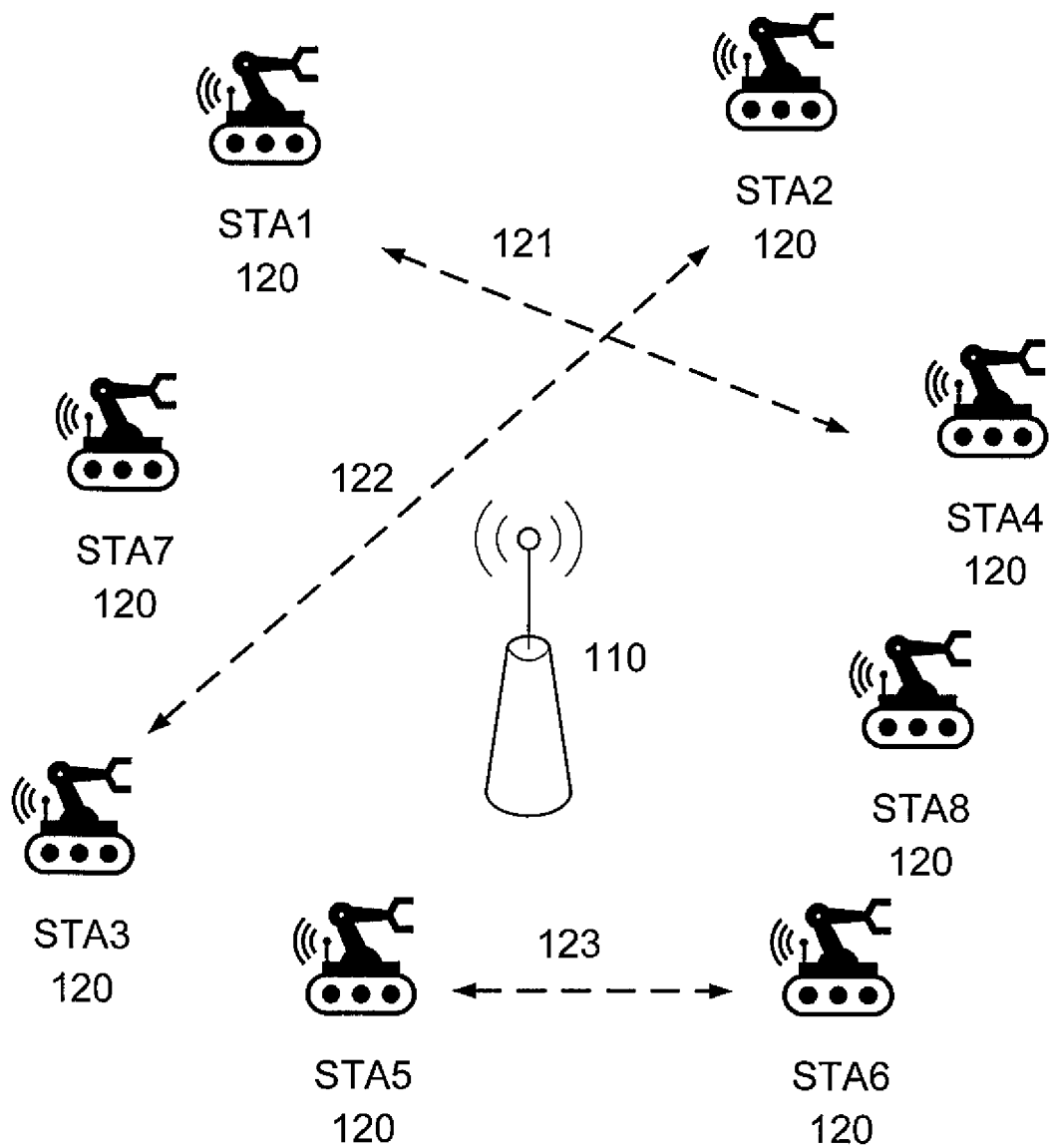
FIG. 1 shows an example Wi-Fi network, according to embodiments of the disclosure.

Various aspects of the illustrative embodiments will be described using terms commonly employed by those skilled in the art to convey the substance of the disclosure to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrases "in an embodiment" "in one embodiment" and "in some embodiments" are used repeatedly herein. The phrase generally does not refer to the same embodiment; however, it may. The terms "comprising," "having," and "including" are synonymous, unless the context indicates otherwise. The phrases "A or B" and "A/B" mean "(A), (B), or (A and B)."

A "Wi-Fi network", as used herein, refers to a network established based on the Institute of Electrical and Electronic Engineers (IEEE) 802.11 family standards, such as, IEEE 802.11 a/b/g/n. Embodiments of the present application provides techniques for AP coordinated P2P communications in the Wi-Fi network. Particularly, the techniques may be applied based on Orthogonal Frequency-Division Multiple Access (OFDMA) introduced by the IEEE 802.11ax standard (which may also be called Wi-Fi 6 or High-Efficiency Wireless (HEW)), for example. Embodiments of the present application extend the IEEE 802.11ax trigger frame and OFDMA resource unit (RU) allocation mechanisms.

Generally, embodiments of the present application propose to use an AP to coordinate the Wi-Fi P2P communications between stations (STAs) based on the OFDMA. In the traditional basic service set (BSS), all data traffic should go through an AP and thus have to be transmitted over Wi-Fi channels for two times, leading to problems, such as, a waste of communication resources and latency. In existing Wi-Fi P2P communication solutions, such as, the Wi-Fi Direct and TDLS, packet collisions happy frequently, when a lot of devices communicate simultaneously, leading to problems, such as, back-off, delay or retransmission. As compared with the traditional BSS and the existing Wi-Fi P2P communication solutions, the present application provides to coordinate the Wi-Fi P2P communications between STAs, using an AP with which all the STAs are associated, based on the OFDMA mechanism of IEEE 802.11ax. The techniques provided herein can be applied for Wi-Fi solutions, such as, in home, enterprises, IoT, etc., for example, in AP products (for example, CHD AP products) and client products of the Intel®, Inc.

FIG. 1 shows an example Wi-Fi network 100, according to embodiments of the disclosure.

As shown in FIG. 1, the Wi-Fi network 100 includes an AP 110 and a plurality of STAs 120, such as, STA1, STA2, . . . , STA7 and STA8, which are associated with the AP 110, in accordance with IEEE 802.11 communication standards. The STA1, STA2, . . . , STA7 and STA8 are shown for illustrative purpose, and the Wi-Fi network 100 may include more or less STAs 120 than shown, according to actual application scenarios. The STAs 120 may be mobile devices that are non-stationary (e.g., not having fixed locations) or may be stationary devices. In some embodiments, the AP 110 and STAs 120 may include one or more function modules similar to those in the functional diagram of FIG. 9 and/or the example machine/system of FIG. 10.

In the Wi-Fi network 100, all the STAs 120 are associated with the AP 110. When two STAs want to communicate with each other, they may establish a virtual P2P connection. As shown in FIG. 1, three virtual P2P connections have been established in the Wi-Fi network 100, including a first virtual P2P connection 121 between STA1 and STA4, a second virtual P2P connection 122 between STA2 and STA3, and a third virtual P2P connection 123 between STA5 and STA6, for example. The virtual P2P connections are also shown for illustrative purpose. The Wi-Fi network 100 may have other virtual P2P connections between other STAs, for example, when STA7 wants to talk with STA8, a virtual P2P connection between STA7 and STA8 may be established. One STA can establish multiple virtual P2P connection with multiple peers, which depends on real application requirements.

Figure 2:
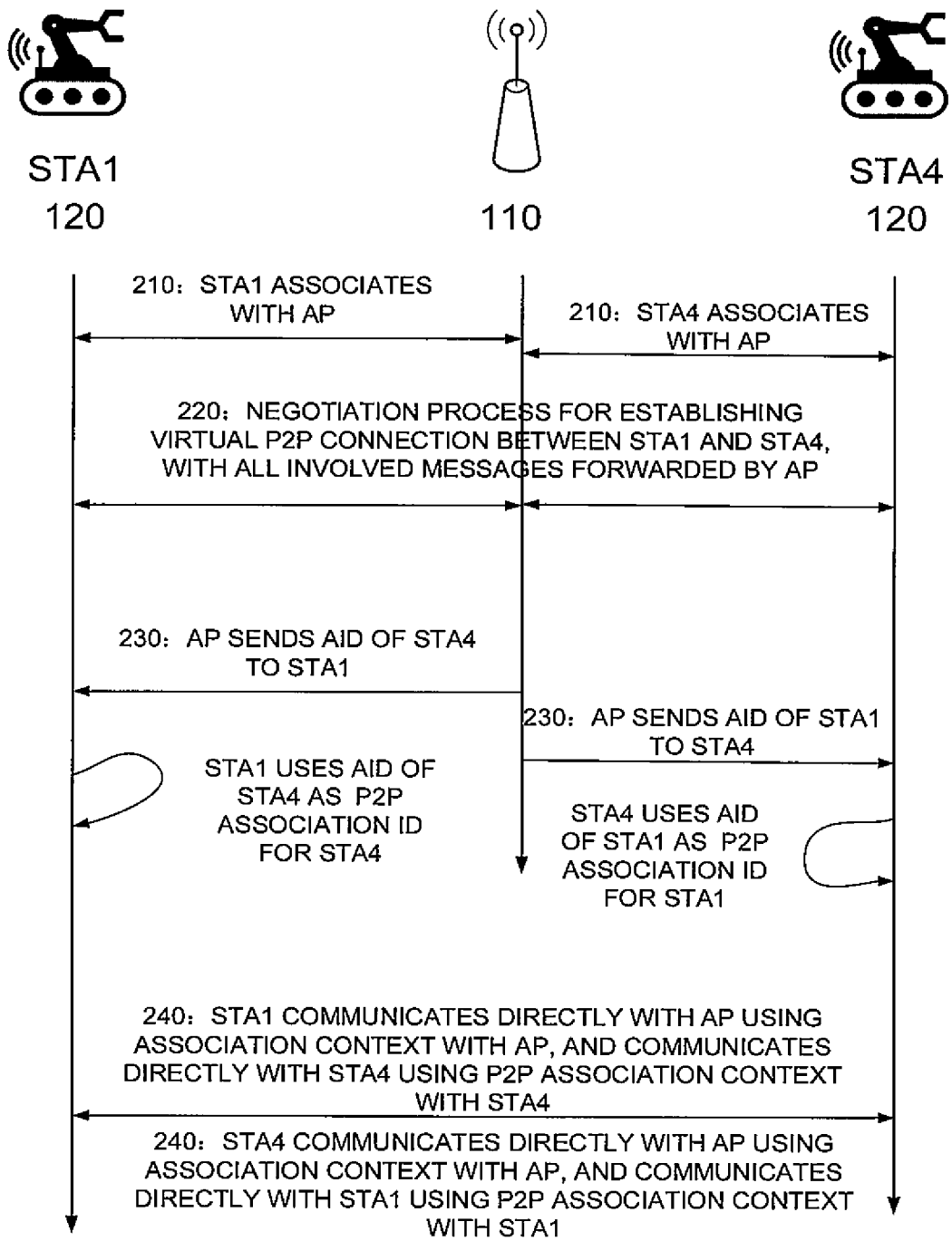
FIG. 2 shows an example process for establishing a virtual P2P connection between two STAs, according to embodiments of the disclosure.

FIG. 2 shows an example process 200 for establishing a virtual P2P connection between two STAs, according to embodiments of the disclosure. Just for illustrative purposes, establishment of the first virtual P2P connection 121 between STA1 and STA4 of FIG. 1 is taken as an example to describe the process 200.

At 210, each STA (e.g., STA1 and STA4 of FIG. 1) may associate with the AP (e.g., AP 110 of FIG. 1) respectively. The associations of each of the STAs with the AP may happen in any order, synchronously or not. During the association process of each STA with the AP, the AP assign an association identity (AID) for the STA.

After associated with the AP, if one of the STAs (e.g., STA1) wants to talk with another STA (e.g., STA4) based on application requirements, it may initiate a negotiation for establishing a virtual P2P connection with the other STA. At 220, STA1 may negotiate with the AP, for establishing the virtual P2P connection with STA4. The negotiation process is similar as common Wi-Fi P2P association, except for that all messages involved in the negotiation are not transmitted directly between the STAs but forwarded by the AP.

At 230, the AP may send an AID of STA4 to STA1 and send an AID of STA 1 to STA4. STA1 may then use the AID of STA4 as a P2P association ID for STA4, and STA 4 may use the AID of STA1 as a P2P association ID for STA1, during Wi-Fi P2P communications between them.

At 240, STA1 may communicate directly with the AP using association context with AP, and communicate directly with STA4 using P2P association context with STA4; and STA4 may communicate directly with the AP using association context with AP, and communicate directly with STA1 using P2P association context with STA1. That is to say, each STA may keep an actual association with the AP and also keep any virtual P2P connection(s) with other peer STA(s) simultaneously.

Back to FIG. 1, the AP 110 may coordinate Wi-Fi P2P communications between any two of the plurality of STAs 120 (the two STAs may be considered as an "STA pair"), after a virtual P2P connection has been established between the two STAs 120.

Figure 3:
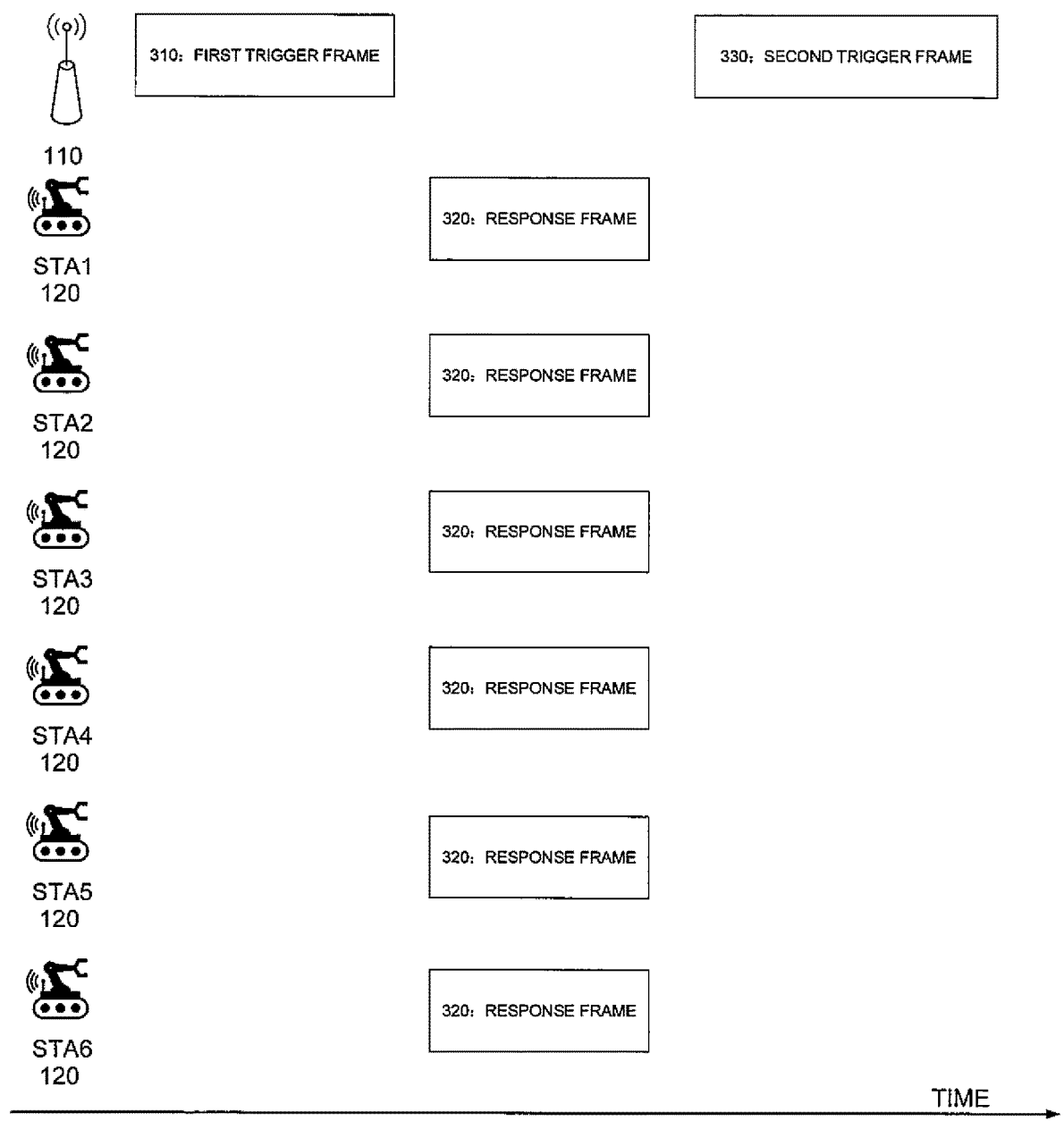
FIG. 3 shows an example message flow of AP coordinated P2P communications in a Wi-Fi network, according to embodiments of the disclosure.

Similar as OFDMA RU allocations in the traditional BSS, the AP 110 may use trigger frames to allocate OFDMA resource units (RUs) for P2P communications between the STAs 120. FIG. 3 shows an example message flow 300 of AP coordinated P2P communications in a Wi-Fi network, according to embodiments of the disclosure. The Wi-Fi network may be the Wi-Fi network 100 of FIG. 1, the AP may be the AP 110 of FIG. 1, and the P2P communications may be implemented on any of the first, second and third virtual P2P connection 121, 122 and 123, or any other virtual P2P connections that may be established between any two of the STAs 120.

The AP 110 may broadcast a first trigger frame 310 to query a buffer status of each of the plurality of STAs 120. In an embodiment, the first trigger frame 310 may be a Multiple User Buffer Status Report Polling (MU_BSRP) trigger frame as defined in IEEE 802.11ax.

Any of the STAs 120 may have a buffer for each virtual P2P connection that has been established, and a buffer for the association with the AP 110. For example, if one STA 120 has N virtual P2P connections with other STAs, it may have N+1 buffers, of which one is for the association with the AP 110, and the N buffers are for the N virtual P2P connections.

After receiving the first trigger frame (e.g., the MU_BSRP trigger frame) 310, each of the plurality of STAs 120 may determine whether it have any data stored in a buffer and to be transmitted to another STA (which may be considered as a "target receiver STA"). If the STA 120 determines that it has data to be transmitted to a target receiver STA, the STA 120 may send a response frame 320 to the AP 110 based on uplink (UL) OFDMA. Alternatively, if the STA 120 determines that it has no data to be transmitted, it will do nothing and the response is not required.

Figure 4:
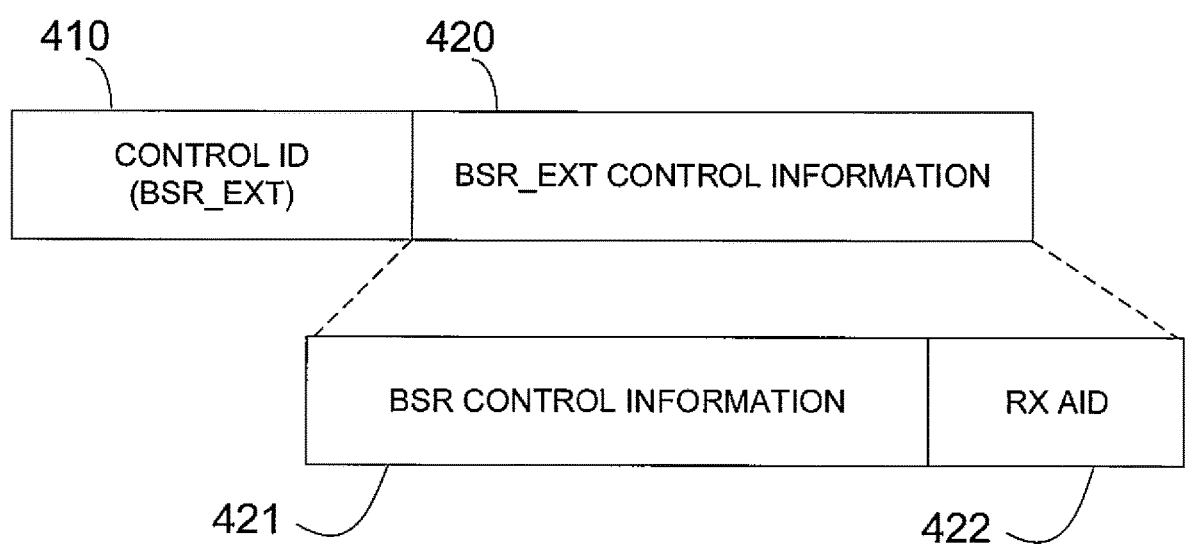
FIG. 4 shows an example A-Control BSR_Ext frame, according to embodiments of the disclosure.

In an embodiment, the response frame 320 may be an A-Control Buffer Status Report Extension (BSR_Ext) frame, which is an extension of the A-Control BSR frame defined in the IEEE 802.11ax. FIG. 4 shows an example A-Control BSR_Ext frame 400, according to embodiments of the disclosure.

The A-Control BSR_Ext frame 400 may include a control ID field 410, which indicates that the frame is "BSR_Ext" frame, and a BSR_Ext control information field 420. The BSR_Ext control information field 420 may contain BSR control information 421 and RX AID 422. The BSR control information 421 may be similar as that has been defined in the IEEE 802.11ax, and may indicate an amount of the data to be transmitted to the target receiver STA for data in a buffer of the STA. The RX AID 422 is a newly added item. The RX AID 422 may be used to identify the target receiver STA. As mentioned, an AID was assigned by the AP when a STA associated with the AP, and is thus unique.

After receiving one or more response frames 320 from one or more of the STAs 120, which have data to be transmitted, the AP 110 may select a group of STAs from the one or more STAs 120 according to a Quality of Service (QoS) policy. The QoS policy may consider factors, such as, an available bandwidth, an amount of data to be transmitted by each of the one or more STAs, or urgency of the data to be transmitted by each of the one or more STAs, among others. As shown in FIG. 3, in an embodiment, the AP 110 may select STA1, STA2 and STA5 to transmit data.

The AP 110 may then use the OFDMA to allocate one or more RUs for each of a group of STAs, based on the one or more response frames.

Figure 5:
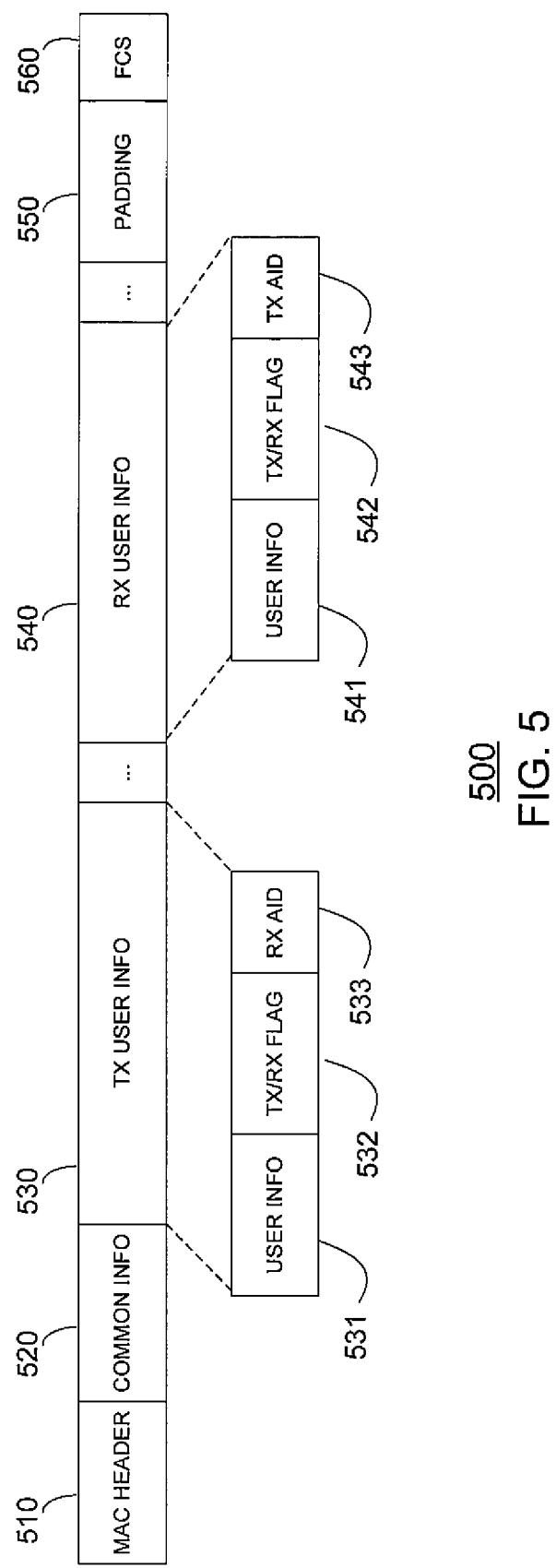
FIG. 5 shows an example MU_P2P trigger frame, according to embodiments of the disclosure.

The AP 110 may send a second trigger frame 330 to the selected group of STAs (e.g., STA1, STA2 and STA5) and the target receiver STA (e.g., STA4, STA3 and STA6) for each of the group of STAs, i.e., the selected group of STA pairs (e.g., (STA1→STA4), (STA2→STA3) and (STA5→STA6)). For example, the second trigger frame 330 may be a Multiple User Peer-to-Peer (MU_P2P) trigger frame. FIG. 5 shows an example MU_P2P trigger frame 500, according to embodiments of the disclosure.

The MU_P2P trigger frame 500 may include a media access control (MAC) header 510, a common info filed 520, a TX User info field 530, a RX User info field 540, padding 550, and a Frame Check Sequence (FCS) 560, among others. The MAC header 510, common info filed 520, padding 550, and FCS 560 are the same as those in a basic trigger frame defined in the IEEE 802.11ax, which will not be detailed herein. The TX User info field 530 and a RX User info field 540 are newly added items. The TX User info field 530 may be used to indicate information of the selected group of STAs (e.g., STA1, STA2 and STA5). The RX User info field 540 may be used to indicate information of the target receiver STA (e.g., STA4, STA3 and STA6) for each of the selected group of STAs.

For example, the TX User info field 530 may include a user info element 531 to indicate the allocation of OFDMA RUs; a TX/RX flag 532 to notify the selected group of STAs to transmit data during the RUs; and a RX AID element 534 to identify the target receiver STA corresponding to each of the selected group of STAs.

Figure 6:
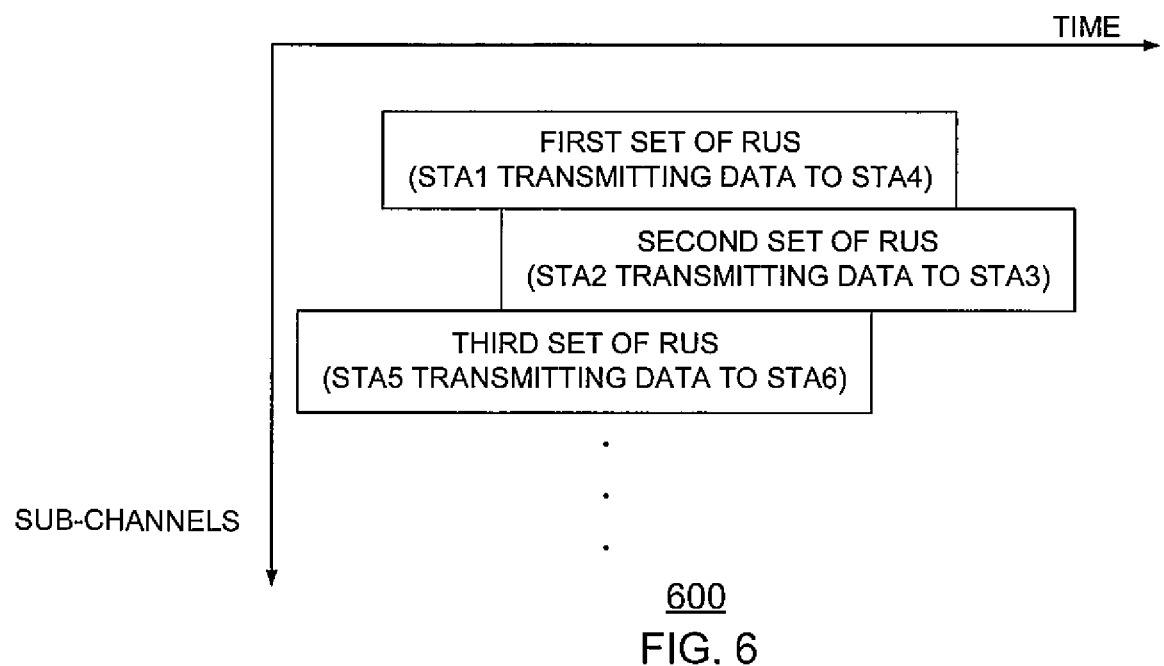
FIG. 6 shows a schematic diagram illustrating Wi-Fi P2P communications using RUs allocated by the AP, according to embodiments of the disclosure.

For example, the RX User info field 540 may include a user info element 541 to indicate the allocation of OFDMA RUs; a TX/RX flag 542 to notify the target receiver STA corresponding to each of the selected group of STAs to receive data during the RUs; and a TX AID element 543 to identify the selected group of STAs which are to transmit data Each STA in the selected STA pairs, after receiving the second trigger frame 330, may determine whether to transmit or receive data, which other STAs to transmit to or which other STAs to receive from, and which RUs can be used for the communication. Each of the selected STA pairs may then use RUs allocated for the pair to perform the Wi-Fi P2P communications. FIG. 6 shows a schematic diagram 600 illustrating Wi-Fi P2P communications using RUs allocated by the AP, according to embodiments of the disclosure.

As shown in FIG. 6, STA1 may transmit data to STA4 during a first set of RUs; STA2 may transmit data to STA3 during a second set of RUs; and STA5 may transmit data to STA6 during a third set of RUs. Other STA pairs may use other allocated RUs for Wi-Fi P2P communications, though not illustrated in the figure.

Figure 7:
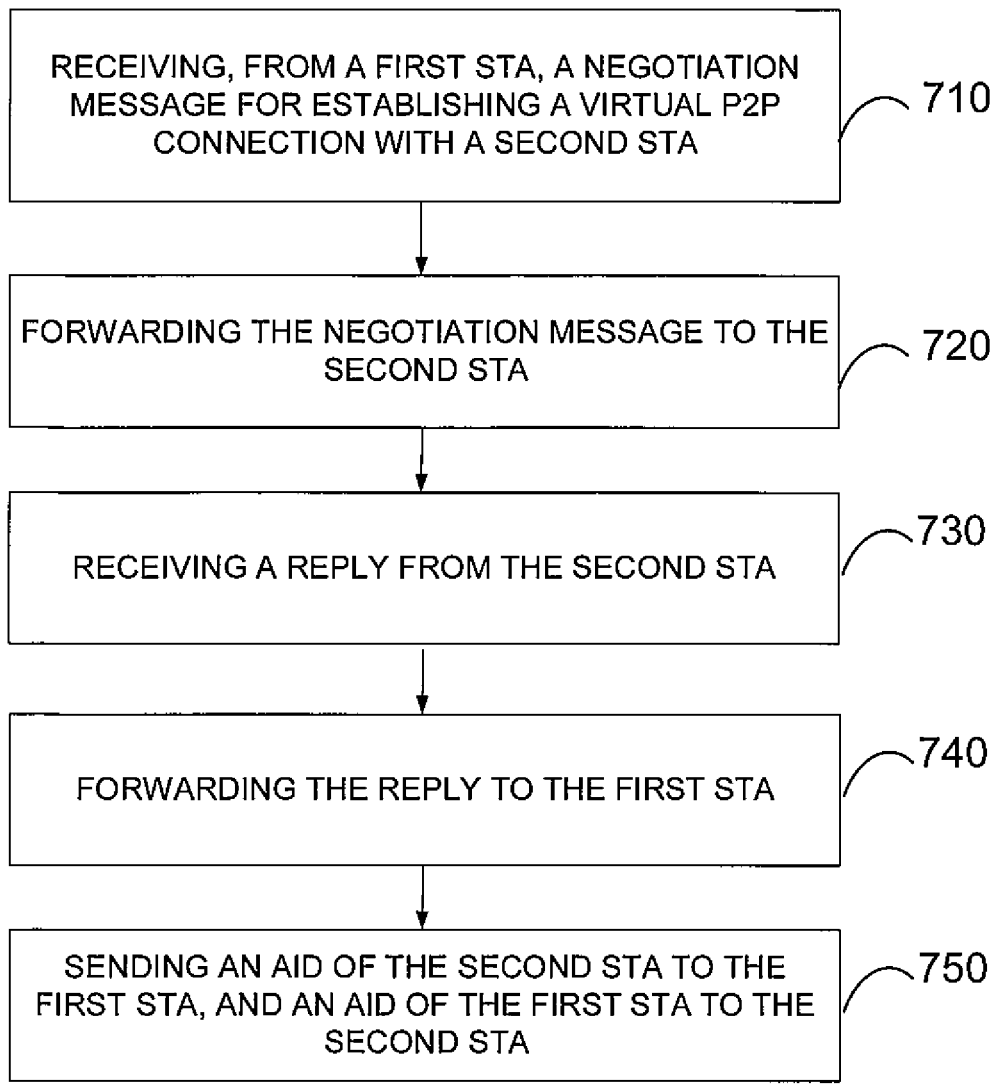
FIG. 7 is a flowchart showing a process performed by an AP to assist establishment of a virtual P2P connection between a pair of STAs in a Wi-Fi network, according to embodiments of the disclosure.

FIG. 7 is a flowchart showing a process 700 performed by an AP to assist establishment of a virtual P2P connection between a pair of STAs in a Wi-Fi network, according to embodiments of the disclosure. The process 700 may be implemented, for example, in the Wi-Fi network 100 described herein with reference to FIG. 1. The AP may be the AP 110 of FIG. 1.

The process 700 may include receiving, from a first STA, a negotiation message for establishing a virtual P2P connection with a second STA, at block 710. The process 700 may include forwarding the negotiation message to the second STA, at block 720. The process 700 may include receiving a reply from the second STA, at block 730. The process 700 may include forwarding the reply to the first STA, at block 740. The process 700 may further include sending an AID of the second STA to the first STA, and an AID of the first STA to the second STA, at block 750. As such, the first STA and the second may use the AID of each other to communicate directly on the virtual P2P connection between them.

Figure 8:
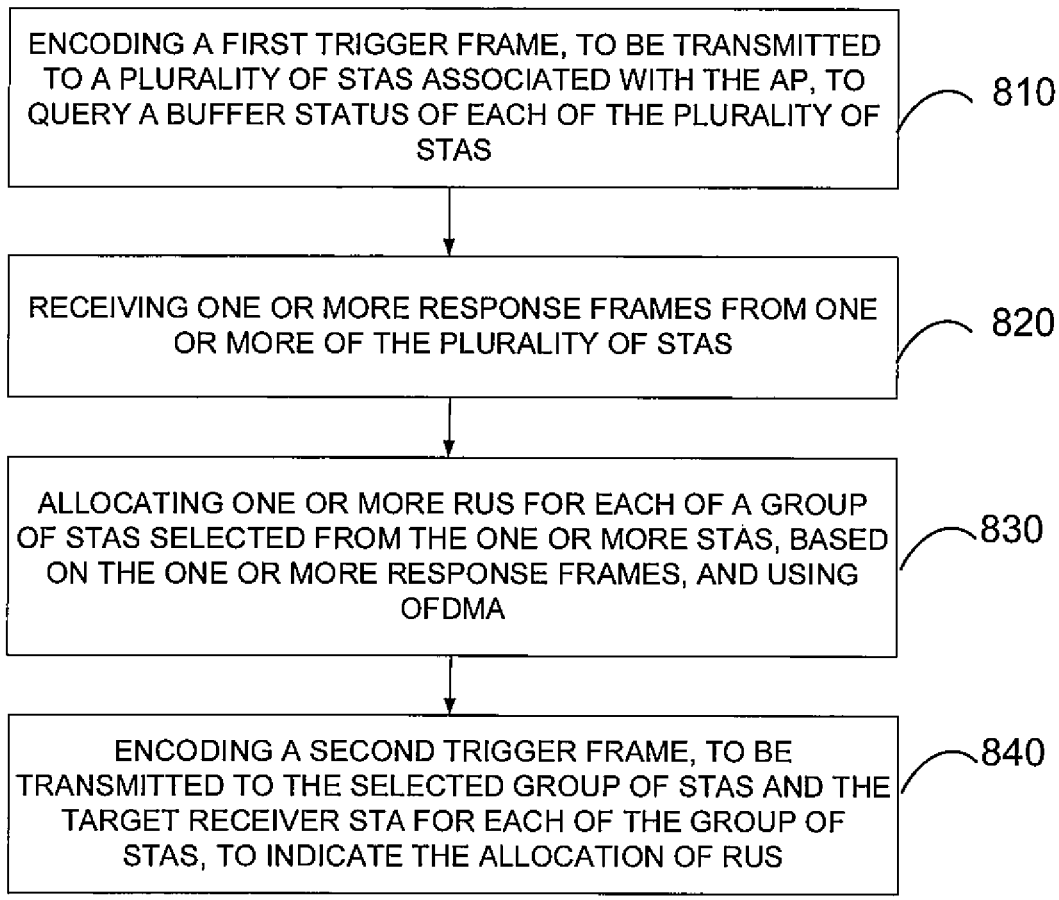
FIG. 8 is a flowchart showing a process performed by an AP to coordinate P2P communications between STAs in a Wi-Fi network, according to embodiments of the disclosure.

FIG. 8 is a flowchart showing a process 800 performed by an AP to coordinate P2P communications between STAs in a Wi-Fi network, according to embodiments of the disclosure. The process 800 may be implemented, for example, in the Wi-Fi network 100 described herein with reference to FIG. 1. The AP may be the AP 110 of FIG. 1.

The process 800 may include, at block 810, encoding a first trigger frame, to be transmitted to a plurality of STAs associated with the AP, to query a buffer status of each of the plurality of STAs. The first trigger frame may be the MU_BSRP trigger frame. The plurality of STAs may include all STAs that are associated with the AP 110, in the Wi-Fi network 100.

The process 800 may include, at block 820, receiving one or more response frames from one or more of the plurality of STAs. Each of the one or more STAs may have data to be transmitted to a target receiver STA in the plurality of STAs. The response frames may be the A-Control BSR_Ext frame 400 of FIG. 4, for example.

The process 800 may include, at block 830, allocating one or more RUs for each of a group of STAs selected from the one or more STAs, based on the one or more response frames, and using OFDMA.

The process 800 may further include, at block 840, encoding a second trigger frame, to be transmitted to the selected group of STAs and the target receiver STA for each of the group of STAs, to indicate the allocation of RUs. The second trigger frame may be the MU_P2P trigger frame 500 of FIG. 5, for example.

Figure 9:
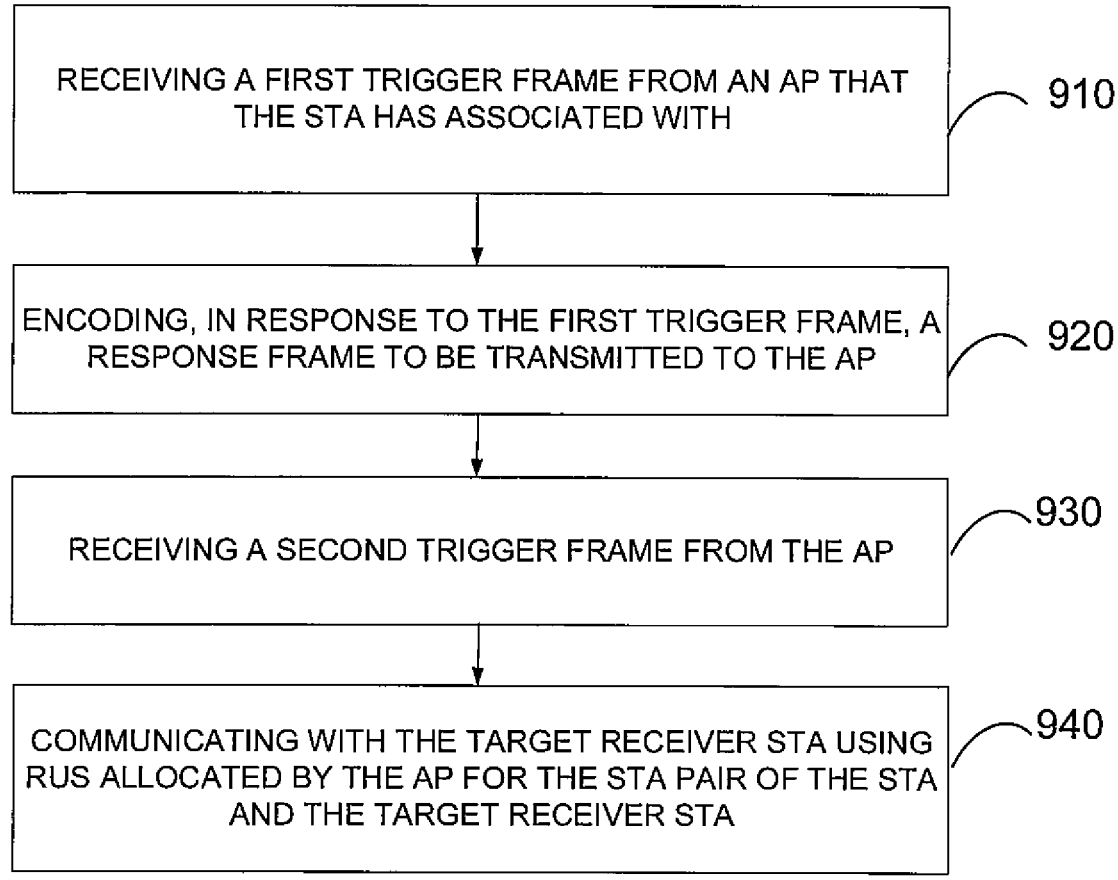
FIG. 9 is a flowchart showing a process performed by a STA for AP coordinated P2P communications with another STA in a Wi-Fi network, according to embodiments of the disclosure.

FIG. 9 is a flowchart showing a process 900 performed by a STA for AP coordinated P2P communications with another STA in a Wi-Fi network, according to embodiments of the disclosure. The process 900 may be implemented, for example, in the Wi-Fi network 100 described herein with reference to FIG. 1. The STA may be any of the plurality of STAs which has a virtual P2P connection, as shown in FIG. 1.

The process 900 may include, at block 910, receiving a first trigger frame from an AP (e.g., the AP 110 of FIG. 1) that the STA has associated with. The first trigger frame is used to query a buffer status of each of a plurality of STAs (including the STA) associated with the AP, for example, STA1, STA2, . . . , STA7 and STA8 associated with the AP 110 as shown in FIG. 1. The first trigger frame may be the MU_BSRP trigger frame.

The process 900 may include, at block 920, encoding, in response to the first trigger frame, a response frame to be transmitted to the AP. The response frames may be the A-Control BSR_Ext frame 400 of FIG. 4, for example. The response frames may indicate that the STA has data to be transmitted to a target receiver STA.

The process 900 may include, at block 930, receiving second trigger frame from the AP. The second trigger frame may be the MU_P2P trigger frame 500 of FIG. 5, for example. The second trigger frame is used to indicate allocation of RUs made by the AP for one or more STA pairs selected from the plurality of STAs.

The process 900 may further include, at block 940, communicating with the target receiver STA using RUs allocated by the AP for the STA pair of the STA and the target receiver STA.

More particularly, each of the process 700 of FIG. 7, process 800 of FIG. 9, and process 900 of FIG. 9 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in each of process 700 of FIG. 7, process 800 of FIG. 9, and process 900 of FIG. 9 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Figure 10:
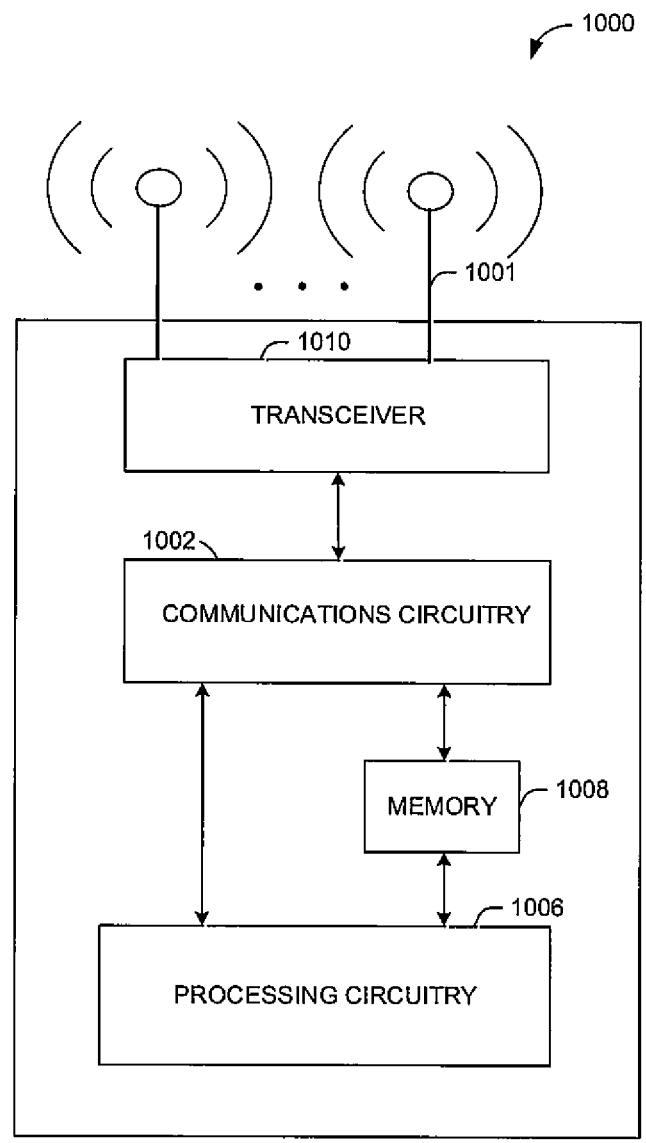
FIG. 10 shows a functional diagram of an exemplary communication device, according to embodiments of the disclosure.

FIG. 10 shows a functional diagram of an exemplary communication device 1000, in accordance with embodiments of the disclosure. In one embodiment, FIG. 10 illustrates a functional block diagram of a communication device that may be suitable for use as any of the AP 110 (FIG. 1) or the STAs 120 (FIG. 1) in accordance with some embodiments. The communication device 1000 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication device 1000 may include communications circuitry 1002 and a transceiver 1010 for transmitting and receiving signals to and from other communication devices using one or more radio frequency (RF) antennas 1001. The communications circuitry 1002 may include circuitry that can operate the physical layer (PHY) communications and/or medium access control (MAC) communications for controlling access to the wireless medium, and/or any other communications layers for transmitting and receiving signals. The communication device 1000 may also include processing circuitry 1006 and memory 1008 arranged to perform the operations described herein. In some embodiments, the communications circuitry 1002 and the processing circuitry 1006 may be configured to perform operations detailed in the above figures, diagrams, and flows.

In accordance with some embodiments, the communications circuitry 1002 may be arranged to contend for a wireless medium and configure frames or packets for communicating over the wireless medium. The communications circuitry 1002 may be arranged to transmit and receive signals. The communications circuitry 1002 may also include circuitry for modulation/demodulation, upconversion/downconversion, filtering, amplification, etc.

The processing circuitry 1006 may be coupled to the communications circuitry 1002 or transceiver 1010 by a RF interface (not shown) to transmit or receive data to and from other communication devices using the RF antennas 1001. In some embodiments, the processing circuitry 1006 of the communication device 1000 may include one or more processors. In other embodiments, two or more RF antennas 1001 may be coupled to the communications circuitry 1002 arranged for sending and receiving signals. The memory 1008 may store information for configuring the processing circuitry 1006 to perform operations for configuring and transmitting message frames and performing the various operations described herein. The memory 1008 may include any type of memory, including non-transitory memory, for storing information in a form readable by a machine (e.g., a computer). For example, the memory 1008 may include a computer-readable storage device, read-only memory (ROM), random-access memory (RAM), magnetic disk storage media, optical storage media, flash-memory devices and other storage devices and media.

In some embodiments, the communication device 1000 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication device 1000 may include one or more RF antennas 1001. The RF antennas 1001 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication device 1000 may include one or more of a keyboard, a display, a non-volatile memory port, multiple antennas, a graphics processor, an application processor, speakers, and other mobile device elements. The display may be an LCD screen including a touch screen.

Although the communication device 1000 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication device 1000 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication device 1000 may include one or more processors and may be configured with instructions stored on a computer-readable storage device.

Figure 11:
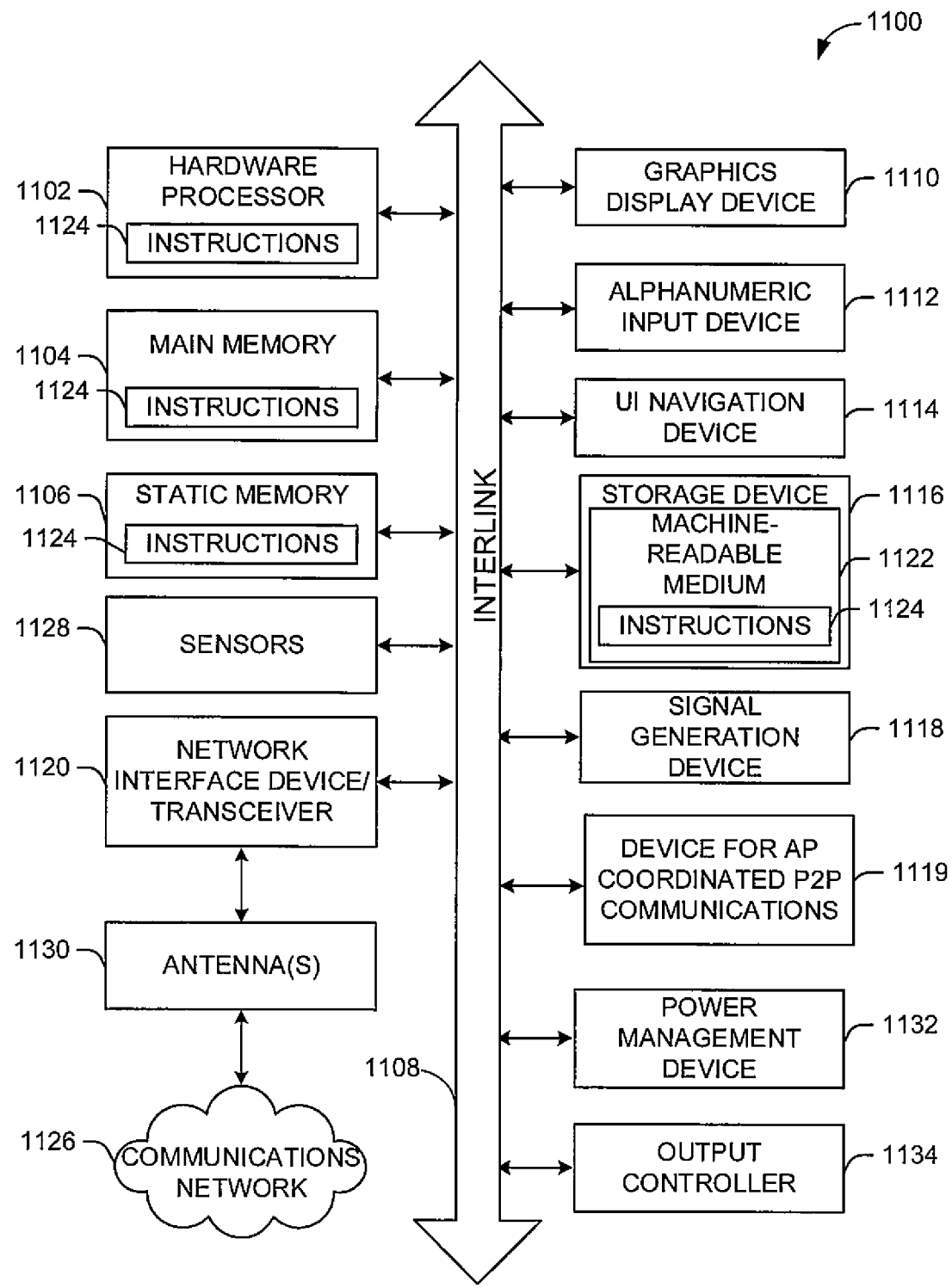
FIG. 11 shows a block diagram of an example of a machine or system upon which any one or more of the techniques discussed herein may be performed.

FIG. 11 illustrates a block diagram of an example of a machine 1100 or system upon which any one or more of the techniques (e.g., methodologies) discussed herein may be performed. In other embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environments. The machine 1100 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a power management device 1132, a graphics display device 1110, an alphanumeric input device 1112 (e.g., a keyboard), and a user interface (UI) navigation device 1114 (e.g., a mouse). In an example, the graphics display device 1110, alphanumeric input device 1112, and UI navigation device 1114 may be a touch screen display. The machine 1100 may additionally include a storage device (e.g., drive unit) 1116, a signal generation device 1118 (e.g., a speaker), a device for AP coordinated P2P communications 1119, a network interface device/transceiver 1120 coupled to antenna(s) 1130, and one or more sensors 1128, such as a global positioning system (GPS) sensor, a compass, an accelerometer, or other sensor. The machine 1100 may include an output controller 1134, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 1102 for generation and processing of the baseband signals and for controlling operations of the main memory 1104, the storage device 1116, and/or the device for AP coordinated P2P communications 1119. The baseband processor may be provided on a single radio card, a single chip, or an integrated circuit (IC).

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within the static memory 1106, or within the hardware processor 1102 during execution thereof by the machine 1100. In an example, one or any combination of the hardware processor 1102, the main memory 1104, the static memory 1106, or the storage device 1116 may constitute machine-readable media.

The device for AP coordinated P2P communications 1119 may carry out or perform any of the operations and processes (e.g., processes 700, 800 and 900) described and shown above.

It is understood that the above are only a subset of what the signaling operation info and device for AP coordinated P2P communications 1119 may be configured to perform and that other functions included throughout this disclosure may also be performed by the device for AP coordinated P2P communications 1119.

While the machine-readable medium 1122 is illustrated as a single medium, the term "machine-readable medium" may include a single medium or multiple media (e.g., a centralized or distributed database, and/or associated caches and servers) configured to store the one or more instructions 1124.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1100 and that cause the machine 1100 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device/transceiver 1120 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1120 may include one or more physical jacks (e.g., Ethernet, coaxial, or phone jacks) or one or more antennas to connect to the communications network 1126. In an example, the network interface device/transceiver 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1100 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 12:
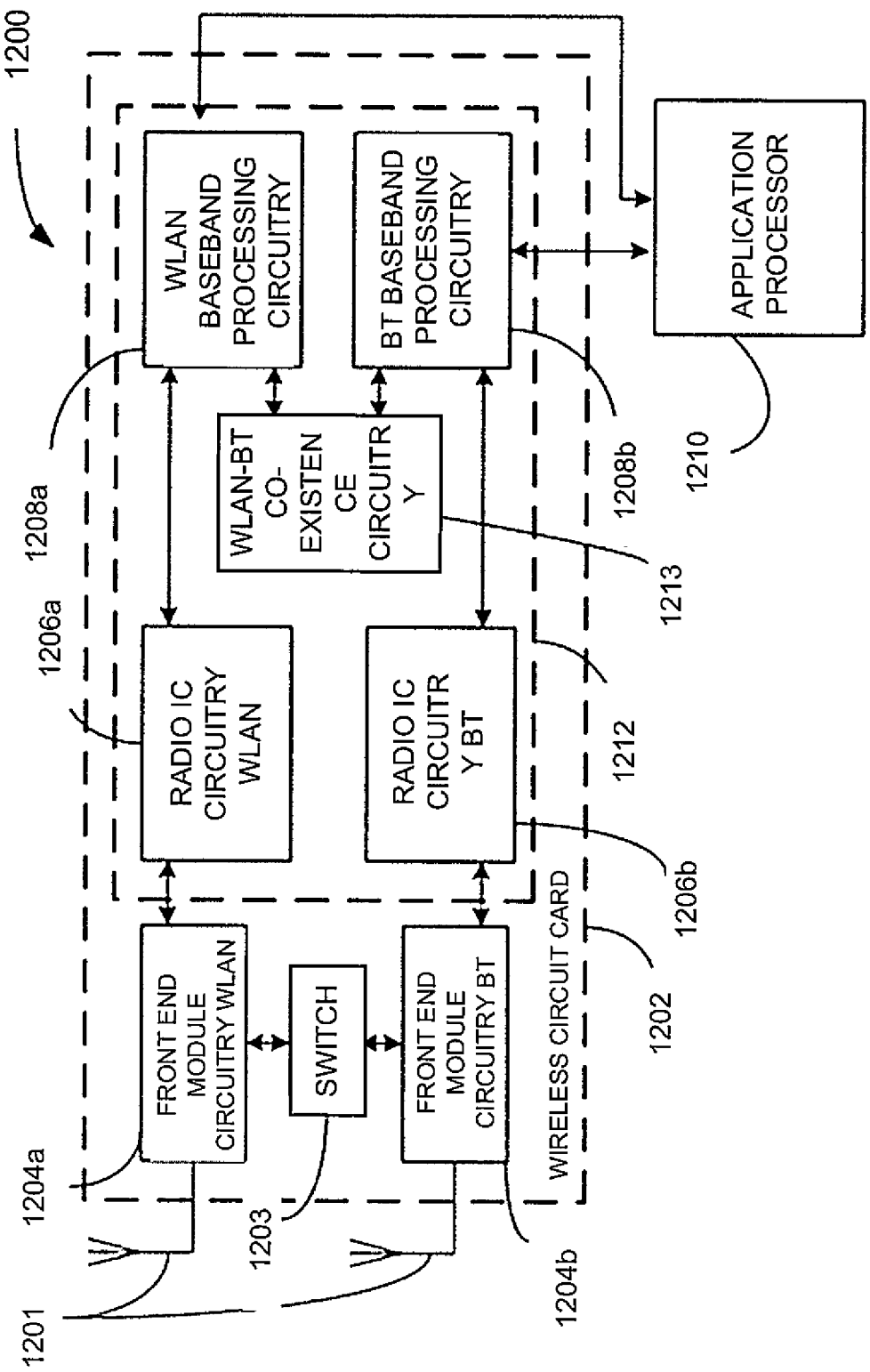
FIG. 12 is a block diagram of a radio architecture, according to embodiments of the disclosure.

FIG. 12 is a block diagram of a radio architecture 1200 in accordance with some embodiments that may be implemented in any Wi-Fi device described above. Radio architecture 1200 may include radio front-end module (FEM) circuitry 1204a-b, radio IC circuitry 1206a-b and baseband processing circuitry 1208a-b. Radio architecture 1200 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1204a-b may include a WLAN or Wi-Fi FEM circuitry 1204a and a Bluetooth (BT) FEM circuitry 1204b. The WLAN FEM circuitry 1204a may include a receive signal path comprising circuitry configured to operate on WLAN RF signals received from one or more antennas 1201, to amplify the received signals and to provide the amplified versions of the received signals to the WLAN radio IC circuitry 1206a for further processing. The BT FEM circuitry 1204b may include a receive signal path which may include circuitry configured to operate on BT RF signals received from one or more antennas 1201, to amplify the received signals and to provide the amplified versions of the received signals to the BT radio IC circuitry 1206b for further processing. FEM circuitry 1204a may also include a transmit signal path which may include circuitry configured to amplify WLAN signals provided by the radio IC circuitry 1206a for wireless transmission by one or more of the antennas 1201. In addition, FEM circuitry 1204b may also include a transmit signal path which may include circuitry configured to amplify BT signals provided by the radio IC circuitry 1206b for wireless transmission by the one or more antennas. In the embodiment of FIG. 12, although FEM 1204a and FEM 1204b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1206a-b as shown may include WLAN radio IC circuitry 1206a and BT radio IC circuitry 1206b. The WLAN radio IC circuitry 1206a may include a receive signal path which may include circuitry to down-convert WLAN RF signals received from the FEM circuitry 1204a and provide baseband signals to WLAN baseband processing circuitry 1208a. BT radio IC circuitry 1206b may in turn include a receive signal path which may include circuitry to down-convert BT RF signals received from the FEM circuitry 1204b and provide baseband signals to BT baseband processing circuitry 1208b. WLAN radio IC circuitry 1206a may also include a transmit signal path which may include circuitry to up-convert WLAN baseband signals provided by the WLAN baseband processing circuitry 1208a and provide WLAN RF output signals to the FEM circuitry 1204a for subsequent wireless transmission by the one or more antennas 1201. BT radio IC circuitry 1206b may also include a transmit signal path which may include circuitry to up-convert BT baseband signals provided by the BT baseband processing circuitry 1208b and provide BT RF output signals to the FEM circuitry 1204b for subsequent wireless transmission by the one or more antennas 1201. In the embodiment of FIG. 12, although radio IC circuitries 1206a and 1206b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1208a-b may include a WLAN baseband processing circuitry 1208a and a BT baseband processing circuitry 1208b. The WLAN baseband processing circuitry 1208a may include a memory, such as, for example, a set of RAM arrays in a Fast Fourier Transform or Inverse Fast Fourier Transform block (not shown) of the WLAN baseband processing circuitry 1208a. Each of the WLAN baseband circuitry 1208a and the BT baseband circuitry 1208b may further include one or more processors and control logic to process the signals received from the corresponding WLAN or BT receive signal path of the radio IC circuitry 1206a-b, and to also generate corresponding WLAN or BT baseband signals for the transmit signal path of the radio IC circuitry 1206a-b. Each of the baseband processing circuitries 1208a and 1208b may further include physical layer (PHY) and medium access control layer (MAC) circuitry, and may further interface with a device for generation and processing of the baseband signals and for controlling operations of the radio IC circuitry 1206a-b.

Referring still to FIG. 12, according to the shown embodiment, WLAN-BT coexistence circuitry 1213 may include logic providing an interface between the WLAN baseband circuitry 1208a and the BT baseband circuitry 1208b to enable use cases requiring WLAN and BT coexistence. In addition, a switch 1203 may be provided between the WLAN FEM circuitry 1204a and the BT FEM circuitry 1204b to allow switching between the WLAN and BT radios according to application needs. In addition, although the antennas 1201 are depicted as being respectively connected to the WLAN FEM circuitry 1204a and the BT FEM circuitry 1204b, embodiments include within their scope the sharing of one or more antennas as between the WLAN and BT FEMs, or the provision of more than one antenna connected to each of FEM 1204a or 1204b.

In some embodiments, the front-end module circuitry 1204a-b, the radio IC circuitry 1206a-b, and baseband processing circuitry 1208a-b may be provided on a single radio card, such as wireless radio card 1202. In some other embodiments, the one or more antennas 1201, the FEM circuitry 1204a-b and the radio IC circuitry 1206a-b may be provided on a single radio card. In some other embodiments, the radio IC circuitry 1206a-b and the baseband processing circuitry 1208a-b may be provided on a single chip or integrated circuit (IC), such as IC 1212.

In some embodiments, the wireless radio card 1202 may include a WLAN radio card and may be configured for Wi-Fi communications, although the scope of the embodiments is not limited in this respect. In some of these embodiments, the radio architecture 1200 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 1200 may be part of a Wi-Fi communication device (STA) such as a wireless access point (AP), a base station or a mobile device. In some of these embodiments, radio architecture 1200 may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11 ay, 802.11ax and/or 802.11be standards and/or proposed specifications for WLANs, although the scope of embodiments is not limited in this respect. Radio architecture 1200 may also be suitable to transmit and/or receive communications in accordance with other techniques and standards.

In some embodiments, the radio architecture 1200 may be configured for high-efficiency Wi-Fi (HEW) communications in accordance with the IEEE 802.11ax standard or extremely high throughput Wi-Fi (Wi-Fi EHT) communications in accordance with the IEEE 802.11be standard. In these embodiments, the radio architecture 1200 may be configured to communicate in accordance with an OFDMA technique, although the scope of the embodiments is not limited in this respect.

In some other embodiments, the radio architecture 1200 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 12, the BT baseband circuitry 1208b may be compliant with a Bluetooth (BT) connectivity standard such as Bluetooth, Bluetooth 8.0 or Bluetooth 6.0, or any other iteration of the Bluetooth Standard.

In some embodiments, the radio architecture 1200 may include other radio cards, such as a cellular radio card configured for cellular (e.g., 3GPP such as LTE, LTE-Advanced or 5G communications).

In some IEEE 802.11 embodiments, the radio architecture 1200 may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 13:
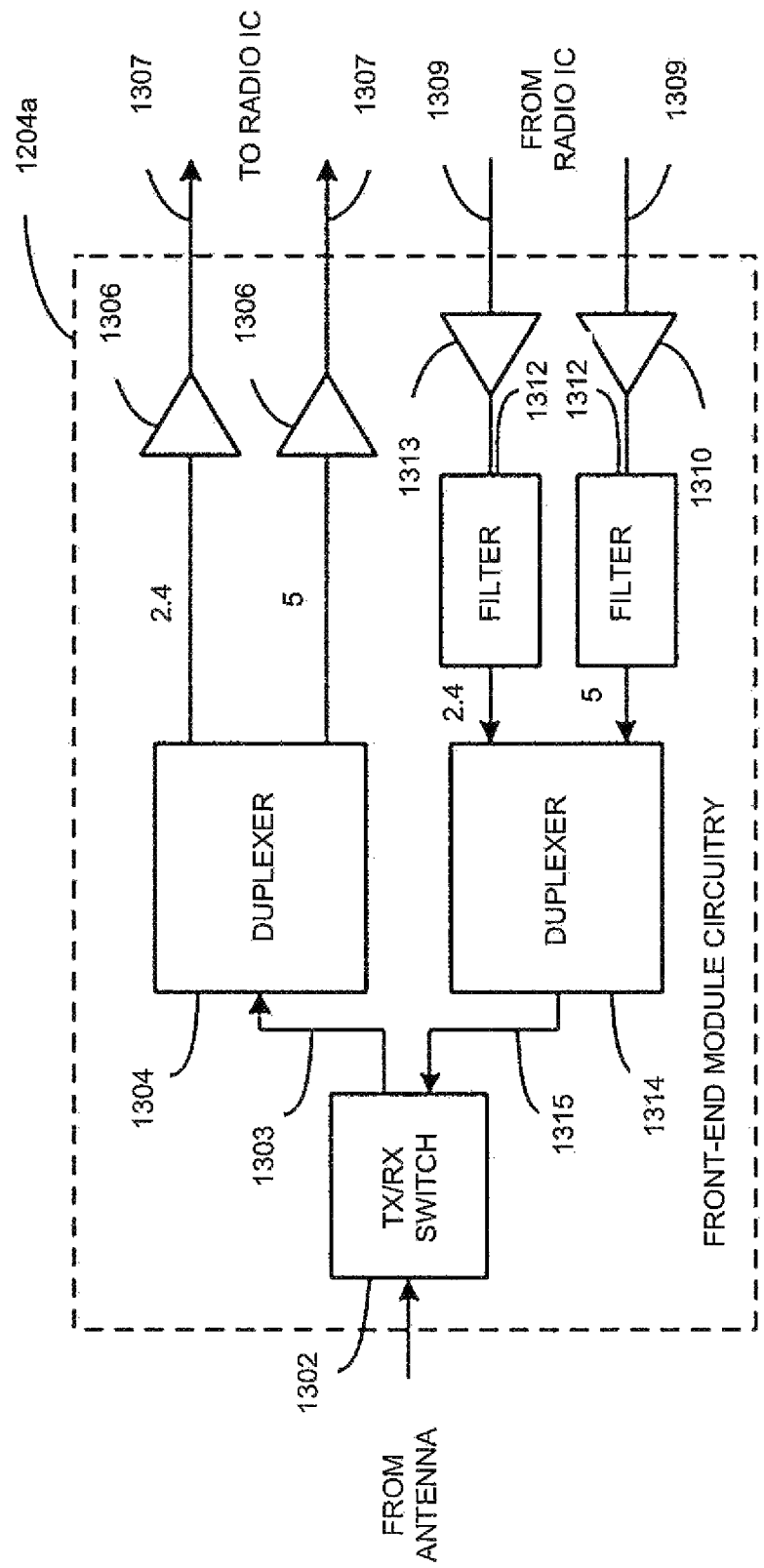
FIG. 13 is a functional block diagram illustrating the WLAN FEM circuitry of FIG. 12.

FIG. 13 illustrates WLAN FEM circuitry 1204a in accordance with some embodiments. Although the example of FIG. 13 is described in conjunction with the WLAN FEM circuitry 1204a, the example of FIG. 13 may be described in conjunction with the example BT FEM circuitry 1204b (FIG. 12), although other circuitry configurations may also be suitable.

In some embodiments, the FEM circuitry 1204a may include a TX/RX switch 1302 to switch between transmit mode and receive mode operation. The FEM circuitry 1204a may include a receive signal path and a transmit signal path. The receive signal path of the FEM circuitry 1204a may include a low-noise amplifier (LNA) 1306 to amplify received RF signals 1303 and provide the amplified received RF signals 1307 as an output (e.g., to the radio IC circuitry 1206a-b (FIG. 12)). The transmit signal path of the circuitry 1204a may include a power amplifier (PA) to amplify input RF signals 1309 (e.g., provided by the radio IC circuitry 1206a-b), and one or more filters 1312, such as band-pass filters (BPFs), low-pass filters (LPFs) or other types of filters, to generate RF signals 1315 for subsequent transmission (e.g., by one or more of the antennas 1201 (FIG. 12)) via an example duplexer 1314.

In some dual-mode embodiments for Wi-Fi communication, the FEM circuitry 1204a may be configured to operate in either the 2.4 GHz frequency spectrum or the 5 GHz frequency spectrum. In these embodiments, the receive signal path of the FEM circuitry 1204a may include a receive signal path duplexer 1304 to separate the signals from each spectrum as well as provide a separate LNA 1306 for each spectrum as shown. In these embodiments, the transmit signal path of the FEM circuitry 1204a may also include a power amplifier 1310 and a filter 1312, such as a BPF, an LPF or another type of filter for each frequency spectrum and a transmit signal path duplexer 1304 to provide the signals of one of the different spectrums onto a single transmit path for subsequent transmission by the one or more of the antennas 1201 (FIG. 12). In some embodiments, BT communications may utilize the 2.4 GHz signal paths and may utilize the same FEM circuitry 1204a as the one used for WLAN communications.

Figure 14:
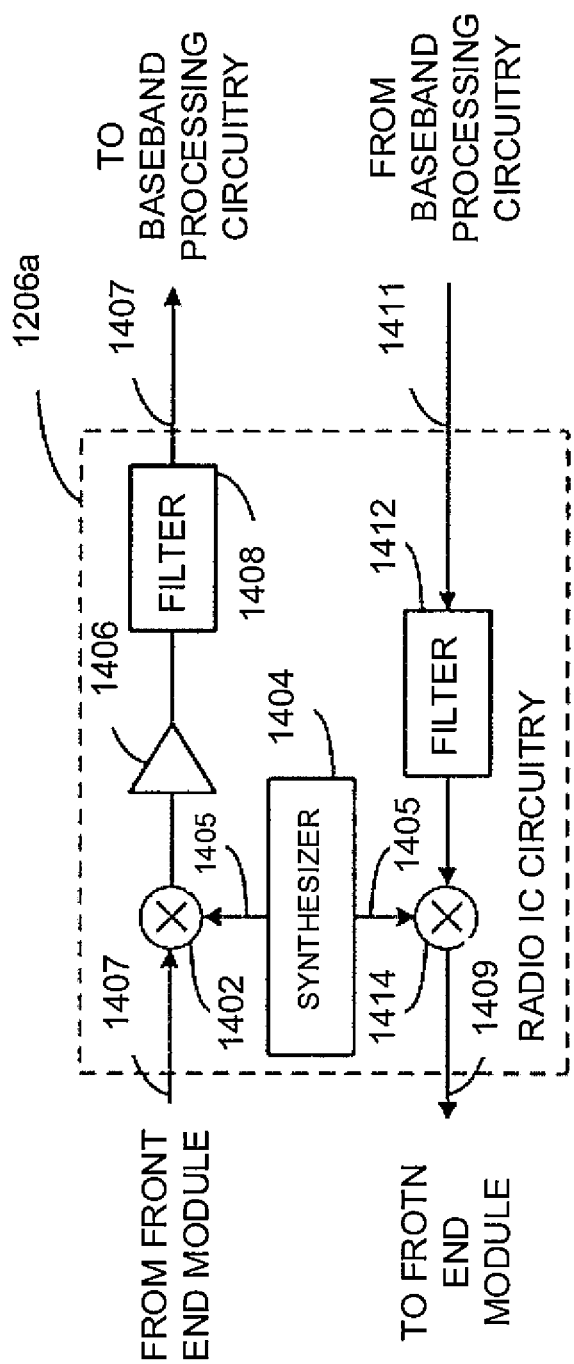
FIG. 14 is a functional block diagram illustrating the radio IC circuitry of FIG. 12.

FIG. 14 illustrates radio IC circuitry 1206a in accordance with some embodiments. The radio IC circuitry 1206a is one example of circuitry that may be suitable for use as the WLAN or BT radio IC circuitry 1206a/1206b (FIG. 12), although other circuitry configurations may also be suitable. Alternatively, the example of FIG. 14 may be described in conjunction with the example BT radio IC circuitry 1206b.

In some embodiments, the radio IC circuitry 1206a may include a receive signal path and a transmit signal path. The receive signal path of the radio IC circuitry 1206a may include at least mixer circuitry 1402, such as, for example, down-conversion mixer circuitry, amplifier circuitry 1406 and filter circuitry 1408. The transmit signal path of the radio IC circuitry 1206a may include at least filter circuitry 1412 and mixer circuitry 1414, such as, for example, up-conversion mixer circuitry. Radio IC circuitry 1206a may also include synthesizer circuitry 1404 for synthesizing a frequency 1405 for use by the mixer circuitry 1402 and the mixer circuitry 1414. The mixer circuitry 1402 and/or 1414 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 14 illustrates only a simplified version of a radio IC circuitry, and may include, although not shown, embodiments where each of the depicted circuitries may include more than one component. For instance, mixer circuitry 1414 may each include one or more mixers, and filter circuitries 1408 and/or 1412 may each include one or more filters, such as one or more BPFs and/or LPFs according to application needs. For example, when mixer circuitries are of the direct-conversion type, they may each include two or more mixers.

In some embodiments, mixer circuitry 1402 may be configured to down-convert RF signals 1307 received from the FEM circuitry 1204a-b (FIG. 12) based on the synthesized frequency 1405 provided by synthesizer circuitry 1404. The amplifier circuitry 1406 may be configured to amplify the down-converted signals and the filter circuitry 1408 may include an LPF configured to remove unwanted signals from the down-converted signals to generate output baseband signals 1407. Output baseband signals 1407 may be provided to the baseband processing circuitry 1208a-b (FIG. 12) for further processing. In some embodiments, the output baseband signals 1407 may be zero-frequency baseband signals, although this is not a requirement. In some embodiments, mixer circuitry 1402 may comprise passive mixers, although the scope of the embodiments is not limited in this respect.

In some embodiments, the mixer circuitry 1414 may be configured to up-convert input baseband signals 1411 based on the synthesized frequency 1405 provided by the synthesizer circuitry 1404 to generate RF output signals 1309 for the FEM circuitry 1204a-b. The baseband signals 1411 may be provided by the baseband processing circuitry 1208a-b and may be filtered by filter circuitry 1412. The filter circuitry 1412 may include an LPF or a BPF, although the scope of the embodiments is not limited in this respect.

In some embodiments, the mixer circuitry 1402 and the mixer circuitry 1414 may each include two or more mixers and may be arranged for quadrature down-conversion and/or up-conversion respectively with the help of synthesizer 1404. In some embodiments, the mixer circuitry 1402 and the mixer circuitry 1414 may each include two or more mixers each configured for image rejection (e.g., Hartley image rejection). In some embodiments, the mixer circuitry 1402 and the mixer circuitry 1414 may be arranged for direct down-conversion and/or direct up-conversion, respectively. In some embodiments, the mixer circuitry 1402 and the mixer circuitry 1414 may be configured for super-heterodyne operation, although this is not a requirement.

Mixer circuitry 1402 may comprise, according to one embodiment: quadrature passive mixers (e.g., for the in-phase (I) and quadrature phase (Q) paths). In such an embodiment, RF input signal 1307 from FIG. 14 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 1405 of synthesizer 1404 (FIG. 14). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1307 (FIG. 13) may comprise a balanced signal, although the scope of the embodiments is not limited in this respect. The I and Q baseband output signals may be provided to low-noise amplifier, such as amplifier circuitry 1406 (FIG. 14) or to filter circuitry 1408 (FIG. 14).

In some embodiments, the output baseband signals 1407 and the input baseband signals 1411 may be analog baseband signals, although the scope of the embodiments is not limited in this respect. In some alternate embodiments, the output baseband signals 1407 and the input baseband signals 1411 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1404 may be a fractional-N synthesizer or a fractional N/N+1 synthesizer, although the scope of the embodiments is not limited in this respect as other types of frequency synthesizers may be suitable. For example, synthesizer circuitry 1404 may be a delta-sigma synthesizer, a frequency multiplier, or a synthesizer comprising a phase-locked loop with a frequency divider. According to some embodiments, the synthesizer circuitry 1404 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1404 may be provided by a voltage controlled oscillator (VCO), although that is not a requirement. A divider control input may further be provided by either the baseband processing circuitry 1208a-b (FIG. 12) depending on the desired output frequency 1405. In some embodiments, a divider control input (e.g., N) may be determined from a look-up table (e.g., within a Wi-Fi card) based on a channel number and a channel center frequency as determined or indicated by the example application processor 1210.

In some embodiments, synthesizer circuitry 1404 may be configured to generate a carrier frequency as the output frequency 1405, while in other embodiments, the output frequency 1405 may be a fraction of the carrier frequency (e.g., one-half the carrier frequency, one-third the carrier frequency). In some embodiments, the output frequency 1405 may be a LO frequency ($f_{LO}$).

Figure 15:
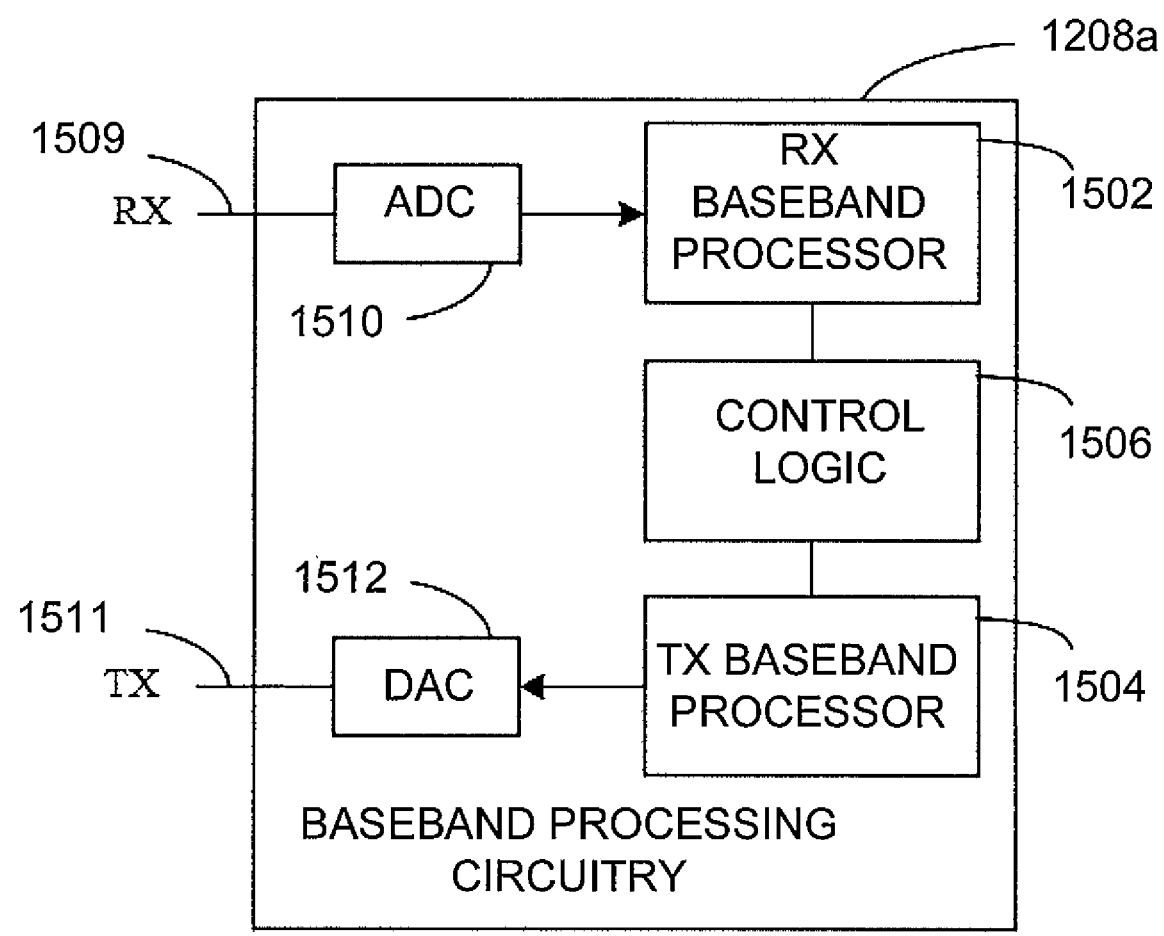
FIG. 15 is a functional block diagram illustrating the baseband processing circuitry of FIG. 12.

FIG. 15 illustrates a functional block diagram of baseband processing circuitry 1208a in accordance with some embodiments. The baseband processing circuitry 1208a is one example of circuitry that may be suitable for use as the baseband processing circuitry 1208a (FIG. 12), although other circuitry configurations may also be suitable. Alternatively, the example of FIG. 14 may be used to implement the example BT baseband processing circuitry 1208b of FIG. 12.

The baseband processing circuitry 1208a may include a receive baseband processor (RX BBP) 1502 for processing receive baseband signals 1409 provided by the radio IC circuitry 1206a-b (FIG. 12) and a transmit baseband processor (TX BBP) 1504 for generating transmit baseband signals 1411 for the radio IC circuitry 1206a-b. The baseband processing circuitry 1208a may also include control logic 1506 for coordinating the operations of the baseband processing circuitry 1208a.

In some embodiments (e.g., when analog baseband signals are exchanged between the baseband processing circuitry 1208a-b and the radio IC circuitry 1206a-b), the baseband processing circuitry 1208a may include ADC 1510 to convert analog baseband signals 1509 received from the radio IC circuitry 1206a-b to digital baseband signals for processing by the RX BBP 1502. In these embodiments, the baseband processing circuitry 1208a may also include DAC 1512 to convert digital baseband signals from the TX BBP 1504 to analog baseband signals 1511.

In some embodiments that communicate OFDM signals or OFDMA signals, such as through baseband processor 1208a, the transmit baseband processor 1504 may be configured to generate OFDM or OFDMA signals as appropriate for transmission by performing an inverse fast Fourier transform (IFFT). The receive baseband processor 1502 may be configured to process received OFDM signals or OFDMA signals by performing an FFT. In some embodiments, the receive baseband processor 1502 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 12, in some embodiments, the antennas 1201 (FIG. 12) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1201 may each include a set of phased-array antennas, although embodiments are not so limited.

Although the radio architecture 1200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The following paragraphs describe examples of various embodiments.

Example 1 includes an apparatus for an access point (AP) in a Wireless Fidelity (Wi-Fi) network, comprising: a Radio Frequency (RF) interface; and processing circuitry, coupled with the RF interface, the processing circuitry is to: encode a first trigger frame, to be transmitted, via the RF interface, to a plurality of stations (STAs) associated with the AP, to query a buffer status of each of the plurality of STAs; receive one or more response frames, via the RF interface, from one or more of the plurality of STAs, each of the one or more STAs having data to be transmitted to a target receiver STA in the plurality of STAs; allocate one or more resource units (RUs) for each of a group of STAs selected from the one or more STAs, based on the one or more response frames, and using Orthogonal Frequency-Division Multiple Access (OFDMA); and encode a second trigger frame, to be transmitted, via the RF interface, to the selected group of STAs and the target receiver STA for each of the group of STAs, to indicate the allocation of RUs.

Example 2 includes the apparatus of Example 1, wherein the first trigger frame is a Multiple User Buffer Status Report Polling (MU_BSRP) trigger frame.

Example 3 includes the apparatus of Example 1, wherein the response frame from each of the one or more STAs is an A-Control Buffer Status Report Extension (BSR_Ext)

frame, including a field to identify a target receiver STA for data in a buffer of the STA and a field to indicate an amount of the data.

Example 4 includes the apparatus of Example 3, wherein the field to identify the target receiver STA includes an association identify (AID) of the target receiver STA.

Example 5 includes the apparatus of Example 3, wherein the field to indicate the amount of the data is a BSR Control Information field.

Example 6 includes the apparatus of Example 1, wherein the field to indicate the amount of the data is a BSR Control Information field.

Example 7 includes the apparatus of Example 6, wherein the TX User info field includes: a user info element to indicate the allocation of RUs; a TX/RX flag to notify the selected group of STAs to transmit data; and a RX AID element to identify the target receiver STA corresponding to each of the selected group of STAs.

Example 8 includes the apparatus of Example 6, wherein the RX User info field includes: a user info element to indicate the allocation of RUs; a TX/RX flag to notify the target receiver STA corresponding to each of the selected group of STAs to receive data; and a TX AID element to identify the selected group of STAs which are to transmit data.

Example 9 includes the apparatus of any of Examples 1-8, wherein the processing circuitry is further to: assist establishment of a virtual peer-to-peer (P2P) connection between a pair of STAs of the plurality of STAs.

Example 10 includes the apparatus of Example 9, wherein to assist the establishment of the virtual P2P connection between the pair of STAs, the processing circuitry is to: forward negotiation messages for the establishment of the virtual P2P connection between the pair of STAs; and notify each STA of the pair of STAs of an association identify (AID) of another STA of the pair of STAs.

Example 11 includes the apparatus of Example 9, wherein each of the plurality of STAs has a buffer for each virtual P2P connection with another STA of the plurality of STAs, and a buffer for an association with the AP.

Example 12 includes the apparatus of any of Examples 1-11, wherein processing circuitry is to select the group of STAs according to a Quality of Service (QoS) policy, including one or more of an available bandwidth, an amount of data to be transmitted by each of the one or more STAs, or urgency of the data to be transmitted by each of the one or more STAs.

Example 13 includes an apparatus for a station (STA) in a Wireless Fidelity (Wi-Fi) network, comprising: a Radio Frequency (RF) interface; and processing circuitry, coupled with the RF interface, the processing circuitry is to: receive a first trigger frame, via the RF interface, from an access point (AP) that the STA has associated with, wherein the first trigger frame is to query a buffer status of each of a plurality of STAs associated with the AP; encode, in response to the first trigger frame, a response frame to be transmitted, via the RF interface, to the AP, wherein the response frame is to indicate that the STA has data to be transmitted to a target receiver STA; receive a second trigger frame, via the RF interface, from the AP, wherein the second trigger frame is to indicate allocation of resource units (RUs) made by the AP for one or more STA pairs selected from the plurality of STAs; and communicate with the target receiver STA using RUs, allocated by the AP for the STA and the target receiver STA.

Example 14 includes the apparatus of Example 13, wherein the first trigger frame is a Multiple User Buffer Status Report Polling (MU_BSRP) trigger frame.

Example 15 includes the apparatus of Example 13, wherein the response frame is an A-Control Buffer Status Report Extension (BSR_Ext) frame including a field to identify the target receiver STA and a field to indicate an amount of the data.

Example 16 includes the apparatus of Example 15, wherein the field identifying the target receiver STA includes an association identify (AID) of the target receiver STA.

Example 17 includes the apparatus of Example 15, wherein the field to indicate the amount of the data is a BSR Control Information field.

Example 18 includes the apparatus of Example 13, wherein the second trigger frame is a Multiple User Peer-to-Peer (MU_P2P) trigger frame, including a TX User info field to indicate information of transmitter STAs of the selected one or more pairs of STAs and a RX User info field to indicate information of corresponding target receiver STAs of the selected one or more pairs of STAs.

Example 19 includes the apparatus of Example 18, wherein the TX User info field includes: a user info element to indicate the allocation of RUs; a TX/RX flag to notify transmitter STAs of the selected one or more pairs of STAs to transmit data; and a RX AID element to identify corresponding target receiver STAs of the selected one or more pairs of STAs.

Example 20 includes the apparatus of Example 18, wherein the RX User info field includes: a user info element to indicate the allocation of RUs; a TX/RX flag to notify target receiver STAs of the selected one or more pairs of STAs to receive data; and a TX AID element to identify the corresponding transmitter STAs of the selected one or more pairs of STAs.

Example 21 includes the apparatus of any of Examples 13-19, wherein the processing circuitry is further to: establish a virtual peer-to-peer (P2P) connection with the target receiver STA, under coordination of the AP.

Example 22 includes the apparatus of Example 21, wherein to establish the virtual P2P connection with the target receiver STA, the processing circuitry is to: negotiate, with the AP, the virtual P2P connection with the target receiver STA; receive, via the RF interface, from the AP, an association identify (AID) of the target receiver STA; and use the AID of the target receiver STA for a P2P communication through the virtual P2P connection with the target receiver STA.

Example 23 includes the apparatus of Example 21, wherein each of the plurality of STAs has a buffer for each virtual P2P connection with another STA of the plurality of STAs, and a buffer for an association with the AP.

Example 24 includes the apparatus of any of Examples 13-23, wherein the one or more STA pairs are selected from the plurality of STAs according to a Quality of Service (QoS) policy, including one or more of an available bandwidth, an amount of data to be transmitted by each of the one or more STAs, or urgency of the data to be transmitted by each of the one or more STAs.

Example 25 includes a non-transitory computer-readable storage medium having instructions stored thereon, which when executed by a processor of an access point (AP) in a Wireless Fidelity (Wi-Fi) network, cause the AP to: transmit a first trigger frame to a plurality of stations (STAs) associated with the AP, to query a buffer status of each of the plurality of STAs; receive one or more response frames from one or more of the plurality of STAs, each of the one or more STAs having data to be transmitted to a target receiver STA in the plurality of STAs; allocate one or more resource units (RUs) for each of a group of STAs selected from the one or more STAs, based on the one or more response frames, and using Orthogonal Frequency-Division Multiple Access (OFDMA); and transmit a second trigger frame to the selected group of STAs and the target receiver STA for each of the group of STAs, to indicate the allocation of RUs.

Example 26 includes the non-transitory computer-readable storage medium of Example 25, wherein the first trigger frame is a Multiple User Buffer Status Report Polling (MU_BSRP) trigger frame.

Example 27 includes the non-transitory computer-readable storage medium of Example 25, wherein the response frame from each of the one or more STAs is an A-Control Buffer Status Report Extension (BSR_Ext) frame, including a field to identify a target receiver STA for data in a buffer of the STA and a field to indicate an amount of the data.

Example 28 includes the non-transitory computer-readable storage medium of Example 27, wherein the field to identify the target receiver STA includes an association identify (AID) of the target receiver STA.

Example 29 includes the non-transitory computer-readable storage medium of Example 27, wherein the field to indicate the amount of the data is a BSR Control Information field.

Example 30 includes the non-transitory computer-readable storage medium of Example 25, wherein the second trigger frame is a Multiple User Peer-to-Peer (MU_P2P) trigger frame, including a TX User info field to indicate information of the selected group of STAs and a RX User info field to indicate information of a target receiver STA corresponding to each of the selected group of STAs.

Example 31 includes the non-transitory computer-readable storage medium of Example 30, wherein the TX User info field includes: a user info element to indicate the allocation of RUs; a TX/RX flag to notify the selected group of STAs to transmit data; and a RX AID element to identify the target receiver STA corresponding to each of the selected group of STAs.

Example 32 includes the non-transitory computer-readable storage medium of Example 30, wherein the RX User info field includes: a user info element to indicate the allocation of RUs; a TX/RX flag to notify the target receiver STA corresponding to each of the selected group of STAs to receive data; and a TX AID element to identify the selected group of STAs which are to transmit data.

Example 33 includes the non-transitory computer-readable storage medium of Example 25, wherein the instructions further cause the AP to: assist establishment of a virtual peer-to-peer (P2P) connection between a pair of STAs of the plurality of STAs.

Example 34 includes the non-transitory computer-readable storage medium of Example 33, wherein to assist the establishment of the virtual P2P connection between the pair of STAs, the instructions further cause the AP to: forward negotiation messages for the establishment of the virtual P2P connection between the pair of STAs; and notify each STA of the pair of STAs of an association identify (AID) of another STA of the pair of STAs.

Example 35 includes the non-transitory computer-readable storage medium of Example 33, wherein each of the plurality of STAs has a buffer for each virtual P2P connection with another STA of the plurality of STAs, and a buffer for an association with the AP.

Example 36 includes the non-transitory computer-readable storage medium of any of Examples 25-35, wherein the instructions cause the AP to select the group of STAs according to a Quality of Service (QoS) policy, including one or more of an available bandwidth, an amount of data to be transmitted by each of the one or more STAs, or urgency of the data to be transmitted by each of the one or more STAs.

Example 37 includes a non-transitory computer-readable storage medium having instructions stored thereon, which when executed by a processor of a station (STA) in a Wireless Fidelity (Wi-Fi) network, cause the STA to: receive a first trigger frame from an access point (AP) that the STA has associated with, wherein the first trigger frame is to query a buffer status of each of a plurality of STAs associated with the AP; transmit a response frame to the AP in response to the first trigger frame, wherein the response frame is to indicate that the STA has data to be transmitted to a target receiver STA; receive a second trigger frame from the AP, wherein the second trigger frame is to indicate allocation of resource units (RUs) made by the AP for one or more STA pairs selected from the plurality of STAs; and communicate with the target receiver STA using RUs, allocated by the AP, for the STA and the target receiver STA.

Example 38 includes the non-transitory computer-readable storage medium of Example 37, wherein the first trigger frame is a Multiple User Buffer Status Report Polling (MU_BSRP) trigger frame.

Example 39 includes the non-transitory computer-readable storage medium of Example 37, wherein the response frame is an A-Control Buffer Status Report Extension (BSR_Ext) frame including a field to identify the target receiver STA and a field to indicate an amount of the data.

Example 40 includes the non-transitory computer-readable storage medium of Example 39, wherein the field identifying the target receiver STA includes an association identify (AID) of the target receiver STA.

Example 41 includes the non-transitory computer-readable storage medium of Example 39, wherein the field to indicate the amount of the data is a BSR Control Information field.

Example 42 includes the non-transitory computer-readable storage medium of Example 37, wherein the second trigger frame is a Multiple User Peer-to-Peer (MU_P2P) trigger frame, including a TX User info field to indicate information of transmitter STAs of the selected one or more pairs of STAs and a RX User info field to indicate information of corresponding target receiver STAs of the selected one or more pairs of STAs.

Example 43 includes the non-transitory computer-readable storage medium of Example 42, wherein the TX User info field includes: a user info element to indicate the allocation of RUs; a TX/RX flag to notify transmitter STAs of the selected one or more pairs of STAs to transmit data; and a RX AID element to identify corresponding target receiver STAs of the selected one or more pairs of STAs.

Example 44 includes the non-transitory computer-readable storage medium of Example 42, wherein the RX User info field includes: a user info element to indicate the allocation of RUs; a TX/RX flag to notify target receiver STAs of the selected one or more pairs of STAs to receive data; and a TX AID element to identify the corresponding transmitter STAs of the selected one or more pairs of STAs.

Example 45 includes the non-transitory computer-readable storage medium of Example 37, wherein the instructions further cause the STA to: establish a virtual peer-to-peer (P2P) connection with the target receiver STA, under coordination of the AP.

Example 46 includes the non-transitory computer-readable storage medium of Example 45, wherein to establish the virtual P2P connection with the target receiver STA, the instructions further cause the STA to: negotiate, with the AP, the virtual P2P connection with the target receiver STA; receive an association identify (AID) of the target receiver STA from the AP; and use the AID of the target receiver STA for a P2P communication through the virtual P2P connection with the target receiver STA.

Example 47 includes the non-transitory computer-readable storage medium of Example 45, wherein each of the plurality of STAs has a buffer for each virtual P2P connection with another STA of the plurality of STAs, and a buffer for an association with the AP.

Example 48 includes the non-transitory computer-readable storage medium of any of Examples 37-47, wherein the one or more STA pairs are selected from the plurality of STAs according to a Quality of Service (QoS) policy, including one or more of an available bandwidth, an amount of data to be transmitted by each of the one or more STAs, or urgency of the data to be transmitted by each of the one or more STAs.

Example 49 includes a method performed by an access point (AP) in a Wireless Fidelity (Wi-Fi) network, comprising: transmitting a first trigger frame to a plurality of stations (STAs) associated with the AP, to query a buffer status of each of the plurality of STAs; receiving one or more response frames from one or more of the plurality of STAs, each of the one or more STAs having data to be transmitted to a target receiver STA in the plurality of STAs; allocating one or more resource units (RUs) for each of a group of STAs selected from the one or more STAs, based on the one or more response frames, and using Orthogonal Frequency-Division Multiple Access (OFDMA); and transmitting a second trigger frame to the selected group of STAs and the target receiver STA for each of the group of STAs, to indicate the allocation of RUs.

Example 50 includes the method of Example 49, wherein the first trigger frame is a Multiple User Buffer Status Report Polling (MU_BSRP) trigger frame.

Example 51 includes the method of Example 49, wherein the response frame from each of the one or more STAs is an A-Control Buffer Status Report Extension (BSR_Ext) frame, including a field to identify a target receiver STA for data in a buffer of the STA and a field to indicate an amount of the data.

Example 52 includes the method of Example 51, wherein the field to identify the target receiver STA includes an association identify (AID) of the target receiver STA.

Example 53 includes the method of Example 51, wherein the field to indicate the amount of the data is a BSR Control Information field.

Example 54 includes the method of Example 49, wherein the second trigger frame is a Multiple User Peer-to-Peer (MU_P2P) trigger frame, including a TX User info field to indicate information of the selected group of STAs and a RX User info field to indicate information of a target receiver STA corresponding to each of the selected group of STAs.

Example 55 includes the method of Example 54, wherein the TX User info field includes: a user info element to indicate the allocation of RUs; a TX/RX flag to notify the selected group of STAs to transmit data; and a RX AID element to identify the target receiver STA corresponding to each of the selected group of STAs.

Example 56 includes the method of Example 54, wherein the RX User info field includes: a user info element to indicate the allocation of RUs; a TX/RX flag to notify the target receiver STA corresponding to each of the selected group of STAs to receive data; and a TX AID element to identify the selected group of STAs which are to transmit data.

Example 57 includes the method of Example 49, further comprising: assisting establishment of a virtual peer-to-peer (P2P) connection between a pair of STAs of the plurality of STAs.

Example 58 includes the method of Example 57, wherein to assist the establishment of the virtual P2P connection between the pair of STAs, the method comprises: forwarding negotiation messages for the establishment of the virtual P2P connection between the pair of STAs; and notifying each STA of the pair of STAs of an association identify (AID) of another STA of the pair of STAs.

Example 59 includes the method of Example 57, wherein each of the plurality of STAs has a buffer for each virtual P2P connection with another STA of the plurality of STAs, and a buffer for an association with the AP.

Example 60 includes the method of any of Examples 49-59, comprising: selecting the group of STAs according to a Quality of Service (QoS) policy, including one or more of an available bandwidth, an amount of data to be transmitted by each of the one or more STAs, or urgency of the data to be transmitted by each of the one or more STAs.

Example 61 includes an apparatus for an access point (AP) in a Wireless Fidelity (Wi-Fi) network, comprising means for performing the method of any of claims 49-60.

Example 62 includes a method performed by a station (STA) in a Wireless Fidelity (Wi-Fi) network, comprising: receiving a first trigger frame from an access point (AP) that the STA has associated with, wherein the first trigger frame is to query a buffer status of each of a plurality of STAs associated with the AP; transmitting a response frame to the AP in response to the first trigger frame, wherein the response frame is to indicate that the STA has data to be transmitted to a target receiver STA; receiving a second trigger frame from the AP, wherein the second trigger frame is to indicate allocation of resource units (RUs) made by the AP for one or more STA pairs selected from the plurality of STAs; and communicating with the target receiver STA using RUs, allocated by the AP, for the STA and the target receiver STA.

Example 63 includes the method of Example 62, wherein the first trigger frame is a Multiple User Buffer Status Report Polling (MU_BSRP) trigger frame.

Example 64 includes the method of Example 62, wherein the response frame is an A-Control Buffer Status Report Extension (BSR_Ext) frame including a field to identify the target receiver STA and a field to indicate an amount of the data.

Example 65 includes the method of Example 64, wherein the field identifying the target receiver STA includes an association identify (AID) of the target receiver STA.

Example 66 includes the method of Example 64, wherein the field to indicate the amount of the data is a BSR Control Information field.

Example 67 includes the method of Example 62, wherein the second trigger frame is a Multiple User Peer-to-Peer (MU_P2P) trigger frame, including a TX User info field to indicate information of transmitter STAs of the selected one or more pairs of STAs and a RX User info field to indicate information of corresponding target receiver STAs of the selected one or more pairs of STAs.

Example 68 includes the method of Example 67, wherein the TX User info field includes: a user info element to indicate the allocation of RUs; a TX/RX flag to notify transmitter STAs of the selected one or more pairs of STAs to transmit data; and a RX AID element to identify corresponding target receiver STAs of the selected one or more pairs of STAs.

Example 69 includes the method of Example 67, wherein the RX User info field includes: a user info element to indicate the allocation of RUs; a TX/RX flag to notify target receiver STAs of the selected one or more pairs of STAs to receive data; and a TX AID element to identify the corresponding transmitter STAs of the selected one or more pairs of STAs.

Example 70 includes the method of Example 62, further comprising: establishing a virtual peer-to-peer (P2P) connection with the target receiver STA, under coordination of the AP.

Example 71 includes the method of Example 70, wherein to establish the virtual P2P connection with the target receiver STA, the method comprises: negotiating, with the AP, the virtual P2P connection with the target receiver STA; receiving an association identify (AID) of the target receiver STA from the AP; and using the AID of the target receiver STA for a P2P communication through the virtual P2P connection with the target receiver STA.

Example 72 includes the method of Example 70, wherein each of the plurality of STAs has a buffer for each virtual P2P connection with another STA of the plurality of STAs, and a buffer for an association with the AP.

Example 73 includes the method of any of Examples 62-72, wherein the one or more STA pairs are selected from the plurality of STAs according to a Quality of Service (QoS) policy, including one or more of an available bandwidth, an amount of data to be transmitted by each of the one or more STAs, or urgency of the data to be transmitted by each of the one or more STAs.

Example 74 includes an apparatus for a station (STA) in a Wireless Fidelity (Wi-Fi) network, comprising means for performing the method of any of claims 62-73.

Example 75 includes a communication system, comprising the apparatus of any of claims 1-12, and the apparatus of any of claims 13-24.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. An apparatus for an access point (AP) in a Wireless Fidelity (Wi-Fi) network, comprising:
    a Radio Frequency (RF) interface; and
    processing circuitry, coupled with the RF interface, the processing circuitry is to:
    encode a first trigger frame, to be transmitted, via the RF interface, to a plurality of stations (STAs) associated with the AP, to query a buffer status of each of the plurality of STAs;
    receive one or more response frames, via the RF interface, from one or more of the plurality of STAs, each of the one or more STAs having data to be transmitted to a target receiver STA in the plurality of STAs;
    allocate one or more resource units (RUs) for each of a group of STAs selected from the one or more STAs, based on the one or more response frames, and using Orthogonal Frequency-Division Multiple Access (OFDMA); and
    encode a second trigger frame, to be transmitted, via the RF interface, to the selected group of STAs and the target receiver STA for each of the group of STAs, to indicate the allocation of RUs,
    wherein the response frame from each of the one or more STAs is an A-Control Buffer Status Report Extension (BSR_Ext) frame, including a field to identify a target receiver STA for data in a buffer of the STA and a field to indicate an amount of the data.

2. The apparatus of claim 1, wherein the first trigger frame is a Multiple User Buffer Status Report Polling (MU_BSRP) trigger frame.

3. The apparatus of claim 1, wherein the field to identify the target receiver STA includes an association identity (AID) of the target receiver STA.

4. The apparatus of claim 1, wherein the field to indicate the amount of the data is a BSR Control Information field.

5. The apparatus of claim 1, wherein the processing circuitry is further to: assist establishment of a virtual peer-to-peer (P2P) connection between a pair of STAs of the plurality of STAs.

6. The apparatus of claim 5, wherein to assist the establishment of the virtual P2P connection between the pair of STAs, the processing circuitry is to:
forward negotiation messages for the establishment of the virtual P2P connection between the pair of STAs; and
notify each STA of the pair of STAs of an association identity (AID) of another STA of the pair of STAs.

7. The apparatus of claim 5, wherein each of the plurality of STAs has a buffer for each virtual P2P connection with another STA of the plurality of STAs, and a buffer for an association with the AP.

8. The apparatus of claim 1, wherein processing circuitry is to select the group of STAs according to a Quality of Service (QOS) policy, including one or more of an available bandwidth, an amount of data to be transmitted by each of the one or more STAs, or urgency of the data to be transmitted by each of the one or more STAs.

9. An apparatus for an access point (AP) in a Wireless Fidelity (Wi-Fi) network, comprising:
a Radio Frequency (RF) interface; and
processing circuitry, coupled with the RF interface, the processing circuitry is to:
encode a first trigger frame, to be transmitted, via the RF interface, to a plurality of stations (STAs) associated with the AP, to query a buffer status of each of the plurality of STAs;
receive one or more response frames, via the RF interface, from one or more of the plurality of STAs, each of the one or more STAs having data to be transmitted to a target receiver STA in the plurality of STAs;
allocate one or more resource units (RUs) for each of a group of STAs selected from the one or more STAs, based on the one or more response frames, and using Orthogonal Frequency-Division Multiple Access (OFDMA); and
encode a second trigger frame, to be transmitted, via the RF interface, to the selected group of STAs and the target receiver STA for each of the group of STAs, to indicate the allocation of RUs,
wherein the second trigger frame is a Multiple User Peer-to-Peer (MU_P2P) trigger frame, including a TX User info field to indicate information of the selected group of STAs and a RX User info field to indicate information of a target receiver STA corresponding to each of the selected group of STAs.

10. The apparatus of claim 9, wherein the TX User info field includes: a user info element to indicate the allocation of RUs; a TX/RX flag to notify the selected group of STAs to transmit data; and a RX AID element to identify the target receiver STA corresponding to each of the selected group of STAs.

11. The apparatus of claim 9, wherein the RX User info field includes: a user info element to indicate the allocation of RUs; a TX/RX flag to notify the target receiver STA corresponding to each of the selected group of STAs to receive data; and a TX AID element to identify the selected group of STAs which are to transmit data.

12. An apparatus for a station (STA) in a Wireless Fidelity (Wi-Fi) network, comprising:
a Radio Frequency (RF) interface; and
processing circuitry, coupled with the RF interface, the processing circuitry is to:
receive a first trigger frame, via the RF interface, from an access point (AP) that the STA has associated with, wherein the first trigger frame is to query a buffer status of each of a plurality of STAs associated with the AP;
encode, in response to the first trigger frame, a response frame to be transmitted, via the RF interface, to the AP, wherein the response frame is to indicate that the STA has data to be transmitted to a target receiver STA;
receive a second trigger frame, via the RF interface, from the AP, wherein the second trigger frame is to indicate allocation of resource units (RUs) made by the AP for one or more STA pairs selected from the plurality of STAs; and
communicate with the target receiver STA using RUs, allocated by the AP for the STA and the target receiver STA,
wherein the response frame is an A-Control Buffer Status Report Extension (BSR_Ext) frame including a field to identify the target receiver STA and a field to indicate an amount of the data.

13. The apparatus of claim 12, wherein the first trigger frame is a Multiple User Buffer Status Report Polling (MU_BSRP) trigger frame.

14. The apparatus of claim 12, wherein the field identifying the target receiver STA includes an association identity (AID) of the target receiver STA.

15. The apparatus of claim 12, wherein the field to indicate the amount of the data is a BSR Control Information field.

16. The apparatus of claim 12, wherein the second trigger frame is a Multiple User Peer-to-Peer (MU_P2P) trigger frame, including a TX User info field to indicate information of transmitter STAs of the selected one or more pairs of STAs and a RX User info field to indicate information of corresponding target receiver STAs of the selected one or more pairs of STAs.

17. The apparatus of claim 16, wherein the TX User info field includes: a user info element to indicate the allocation of RUs; a TX/RX flag to notify transmitter STAs of the selected one or more pairs of STAs to transmit data; and a RX AID element to identify corresponding target receiver STAs of the selected one or more pairs of STAs.

18. The apparatus of claim 16, wherein the RX User info field includes: a user info element to indicate the allocation of RUs; a TX/RX flag to notify target receiver STAs of the selected one or more pairs of STAs to receive data; and a TX AID element to identify the corresponding transmitter STAs of the selected one or more pairs of STAs.

19. The apparatus of claim 12, wherein the processing circuitry is further to:
establish a virtual peer-to-peer (P2P) connection with the target receiver STA, under coordination of the AP.

20. The apparatus of claim 19, wherein each of the plurality of STAs has a buffer for each virtual P2P connection with another STA of the plurality of STAs, and a buffer for an association with the AP.

* * * * *